United States Patent
Causey et al.

(10) Patent No.: US 11,081,901 B2
(45) Date of Patent: *Aug. 3, 2021

(54) WIRELESS CHARGING OF MOBILE DEVICES

(71) Applicant: AT&T Mobility II LLC, Atlanta, GA (US)

(72) Inventors: Mark Causey, Tucker, GA (US); Adrianne Binh Luu, Atlanta, GA (US); J. Michael Williams, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,862

(22) Filed: Aug. 2, 2019

(65) Prior Publication Data

US 2019/0356155 A1    Nov. 21, 2019

Related U.S. Application Data

(63) Continuation of application No. 15/874,979, filed on Jan. 19, 2018, now Pat. No. 10,418,843, which is a continuation of application No. 15/175,195, filed on Jun. 7, 2016, now Pat. No. 9,912,189, which is a continuation of application No. 13/592,577, filed on Aug. 23, 2012, now Pat. No. 9,385,557.

(51) Int. Cl.
*H02J 7/02* (2016.01)
*H02J 7/00* (2006.01)

(52) U.S. Cl.
CPC ............ *H02J 7/025* (2013.01); *H02J 7/0071* (2020.01); *H02J 7/00034* (2020.01)

(58) Field of Classification Search
CPC ....... H02J 7/025; H02J 7/0071; H02J 7/00034
See application file for complete search history.

(56) References Cited

U.S. PATENT DOCUMENTS

| | | | |
|---|---|---|---|
| 7,076,375 B2 | 7/2006 | Raichle et al. | |
| 7,671,559 B2 | 3/2010 | Ludtke | |
| 7,948,208 B2 | 5/2011 | Partovi et al. | |
| 8,102,147 B2 | 1/2012 | Jung | |
| 8,111,042 B2 | 2/2012 | Bennett | |
| 8,116,681 B2 | 2/2012 | Baarman | |
| 8,169,185 B2 | 5/2012 | Partovi et al. | |
| 8,183,827 B2 | 5/2012 | Lyon | |
| 2008/0079392 A1 | 4/2008 | Baarman et al. | |
| 2009/0199140 A1 | 8/2009 | Kariat | |
| 2010/0052930 A1 | 3/2010 | Grigsby | |
| 2010/0164296 A1* | 7/2010 | Kurs ................ | H01F 38/14 307/104 |
| 2010/0188041 A1 | 7/2010 | Mizuo | |
| 2011/0018679 A1* | 1/2011 | Davis ............... | H02J 50/12 340/3.1 |
| 2011/0234156 A1 | 9/2011 | Fujita | |
| 2011/0248674 A1 | 10/2011 | Baarman et al. | |
| 2011/0264297 A1 | 10/2011 | Nakano | |
| 2012/0001592 A1 | 1/2012 | Fukaya | |
| 2012/0091950 A1 | 4/2012 | Campanella et al. | |
| 2013/0103960 A1 | 4/2013 | Alberth | |

* cited by examiner

*Primary Examiner* — Nha T Nguyen

(57) ABSTRACT

Methods, systems, and products describe a car, truck, or other vehicle that charges a battery in a mobile device. The vehicle wirelessly inductively charges the battery based on historical usage.

20 Claims, 26 Drawing Sheets

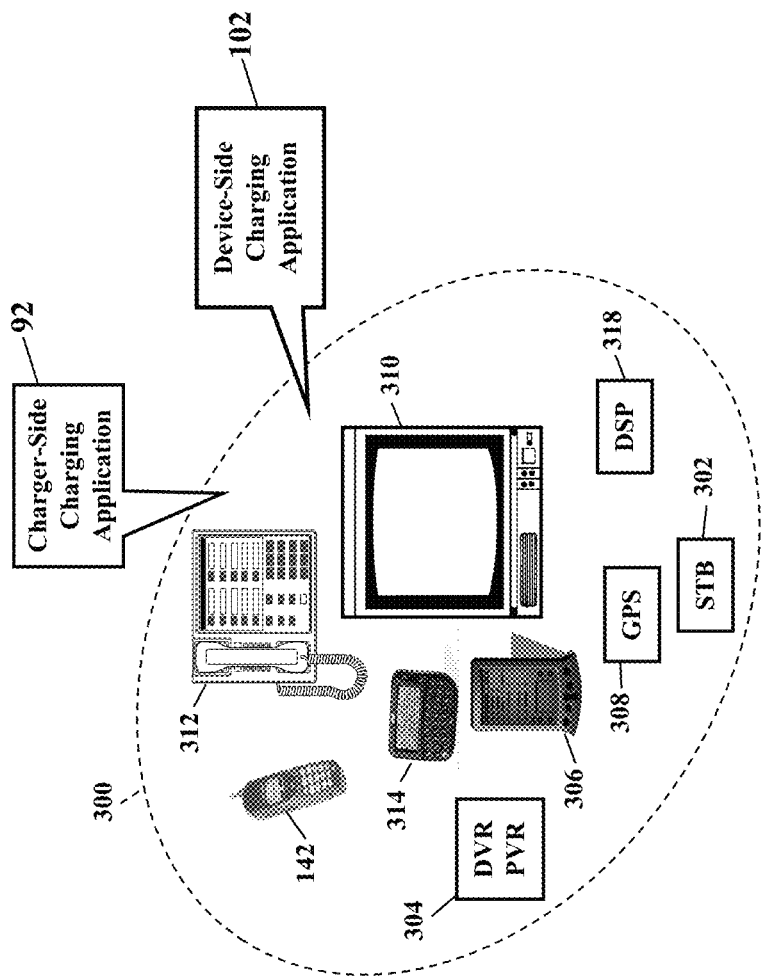

WIRELESS CHARGING OF MOBILE DEVICES

CROSS-REFERENCE TO RELATED APPLICATIONS

This patent application is a continuation of U.S. application Ser. No. 15/874,979 filed Jan. 19, 2018 and since issued as U.S. Pat. No. 10,418,843, which is a continuation of U.S. application Ser. No. 15/175,195 filed Jun. 7, 2016 and since issued as U.S. Pat. No. 9,912,189, which is a continuation of U.S. application Ser. No. 13/592,577 filed Aug. 23, 2012 and since issued as U.S. Pat. No. 9,385,557, with all patent applications incorporated herein by reference in their entireties.

BACKGROUND

Mobile devices have batteries. Cell phones, laptop computers, and tablets are all available with a rechargeable battery. When the battery is drained, the battery is recharged for continued use.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 25-26 are schematics illustrating processor-controlled devices, according to still more exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
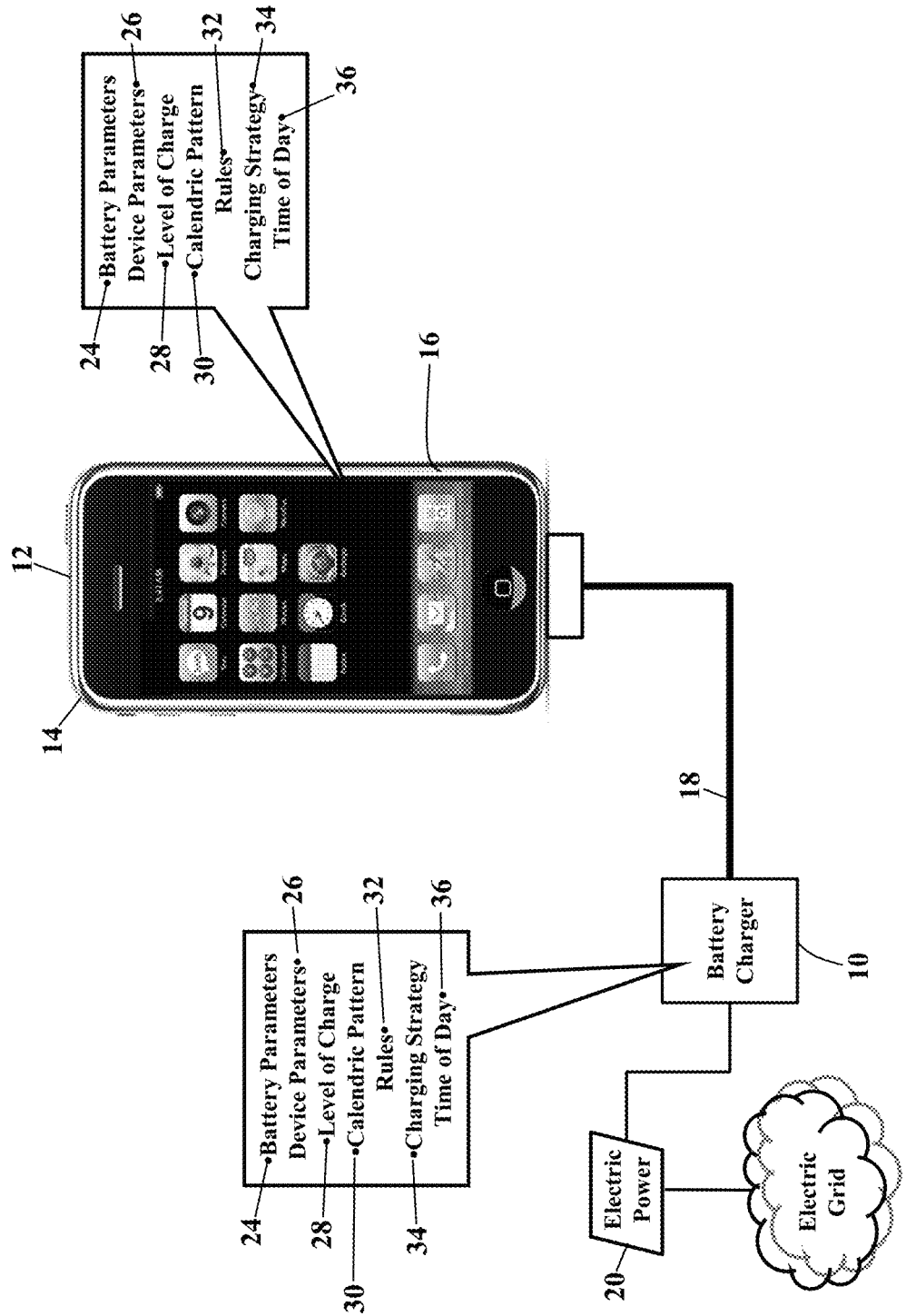
FIGS. 1-2 are simplified schematics illustrating an operating environment in which exemplary embodiments may be implemented.
Figure 2:
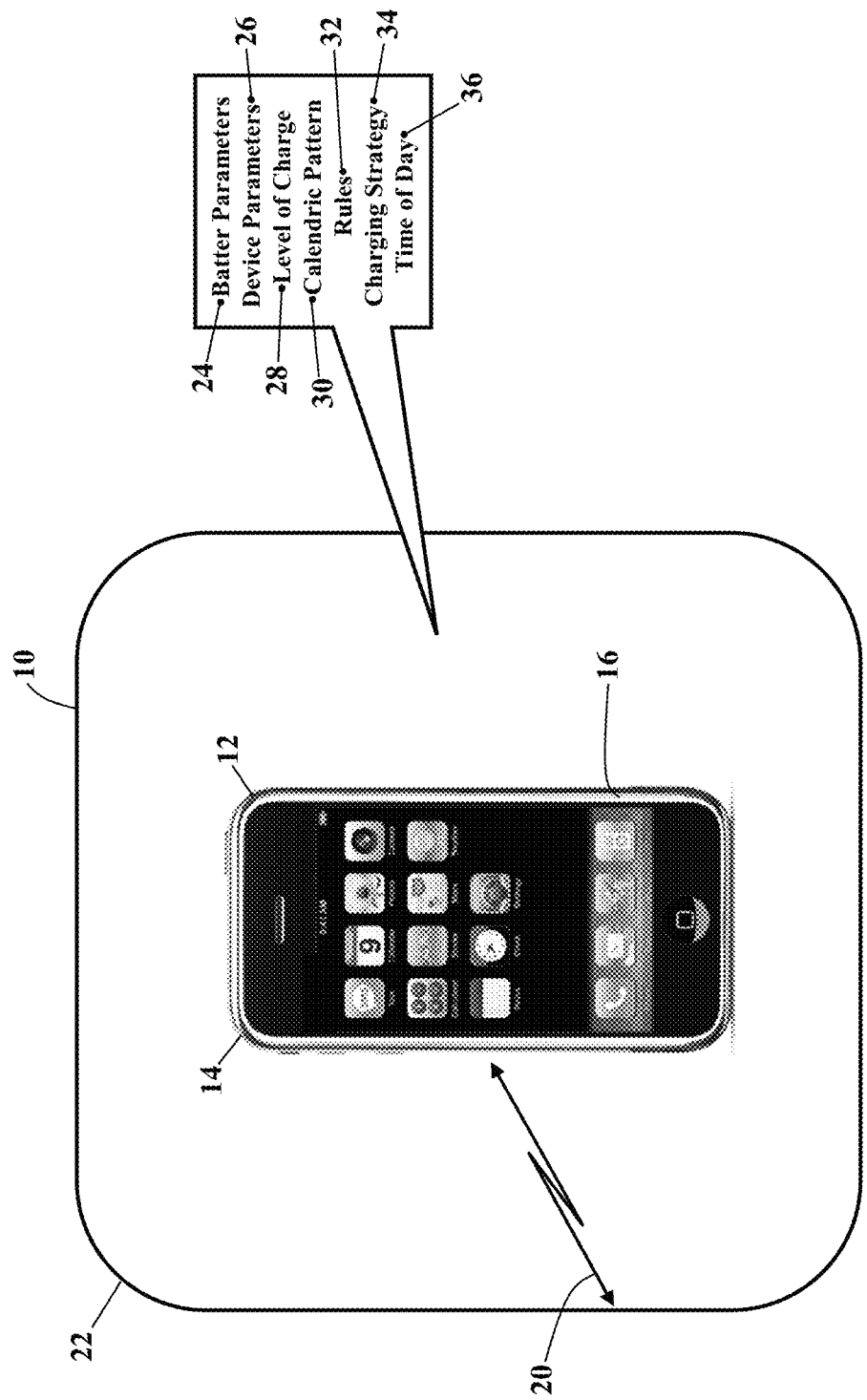

FIGS. 1-2 are simplified schematics illustrating an environment in which exemplary embodiments may be implemented. FIG. 1 illustrates a battery charger 10 and a mobile device 12. The mobile device 12 is illustrated as a smart phone 14, but the mobile device 12 may be a laptop computer, a tablet computer, or any other processor-controlled device (as later paragraphs will explain). Regardless, the mobile device 12 has a battery 16. When usage of the mobile device 12 depletes the battery 16, the battery 16 must be recharged.

The battery 16 may be wiredly charged. That is, a physical charging cord 18 may connect between the battery charger 10 and the mobile device 12. As most readers understand, the battery charger 10 receives electrical power 20 (such as from the electric grid) and sends at least some of the electrical power 20 to the mobile device 12 via the charging cord 18. The battery charger 10 and/or the mobile device 12 may condition the electrical power 20 (such as AC/DC transformation and/or rectification), and the mobile device 12 transfers the electrical power 20 to the battery 16. The electrical power 20 recharges the battery 16 for continued use of the mobile device 12.

FIG. 2 illustrates wireless charging. Here the electrical power 20 is wirelessly transferred from the battery charger 10 to the mobile device 12. The battery charger 10 and the mobile device 12 inductively couple to transfer the electrical power 20. FIG. 2 illustrates the battery charger as a pad 22 that inductively charges the battery 16 in the mobile device 12. The mobile device 12 is merely laid on the pad 22, and the electrical power 20 is inductively transferred from the pad 22 to the mobile device 12. That is, although the mobile device 12 merely lays on the pad 22, the battery 16 is wirelessly charged for continued use. Wireless, inductive charging is known, so a more detailed explanation is unnecessary.

As both FIGS. 1 and 2 illustrate, though, exemplary embodiments may retrieve much information to ensure the battery 16 is adequately charged. When the battery charger 10 and the mobile device 12 establish communication, for example, battery parameters 24 may be sent. The mobile device 12, for example, may sent the type of the battery 16, such as the battery's chemical composition, manufacturer, and/or model. Device parameters 26 may also be retrieved, such as the make, model, and serial number of the mobile device 12.

The condition of the battery 12 may also be exchanged. A current level 28 of charge of the battery 16, for example, may be sent from the mobile device 12. The current level 28 of charge describes a current condition or state of the battery 16, such as an amount of electrical power stored in or available from the battery 16. The current level 28 of charge may be determined from a load test, but any method, measurement, or apparatus may be used.

A calendric pattern 30 may also be exchanged. Whether wired or wireless charging is used, the calendric pattern 30 may be used when charging the battery 16. The calendric pattern 30 describes patterns of monthly, weekly, and/or daily usage of the mobile device 12. The calendric pattern 30, for example, describes dates and times that the mobile device 12 is typically used. The calendric pattern 30 may be stored in the mobile device 12, and the calendric pattern 30 may be retrieved when the battery 16 needs charging.

Rules 32 may also be established. One or more objectives may be logically expressed as the rules 32 to ensure the battery 16 is always charged for usage of the mobile device 12. One such rule 32, for example, is minimum energy consumption of the battery charger 10. The battery charger 10 can consume substantial electrical energy, especially when multiple mobile devices are charged (as later paragraphs will explain). Smart management of the battery charger 10 may thus reduce energy consumption and costs.

A charging strategy 34 is thus developed. Once the long-term usage of the mobile device 12 is known, the battery 16 may be smartly charged (such as to consume no more energy than minimally required). The battery charger 10 and/or the mobile device 12 develop the charging strategy 34, based on the calendric pattern 30, the battery parameters 24, and/or the device parameters 26. The battery charger 10 and the mobile device 12 may then cooperate to charge the battery 16, according to the charging strategy 34. That is, exemplary embodiments may constantly monitor a current time 36 of day, the condition of the battery 16, the calendric pattern 30, and rules 32. The charging strategy 34 may thus charge the battery 16 to satisfy the upcoming calendric pattern 30 while enforcing or adhering to the rules 32.

FIGS. 3-9 are graphs further illustrating the calendric pattern 30, according to exemplary embodiments. FIGS. 3-9 illustrate how habitual usage of the mobile device 12 may be discerned and exploited to intelligently charge the battery (illustrated as reference numeral 16 in FIGS. 1-2). Daily, weekly, and even monthly calendric usage of the mobile device 12 may be monitored to learn how and when the mobile device 12 is habitually used. Indeed, exemplary embodiments may continue monitoring calendric usage for even longer periods of time (such as several months or even years) to discern the recurring calendric pattern 30. The calendric pattern 30 may then be used to predict future usage of the mobile device 12. That is, using previous or past habitual usage, exemplary embodiments may predict how the mobile device 12 will be used in the future. Exemplary embodiments may then intelligently develop the charging strategy 34 to ensure the battery 16 is always charged to satisfy the calendric pattern 30.

Figure 3:
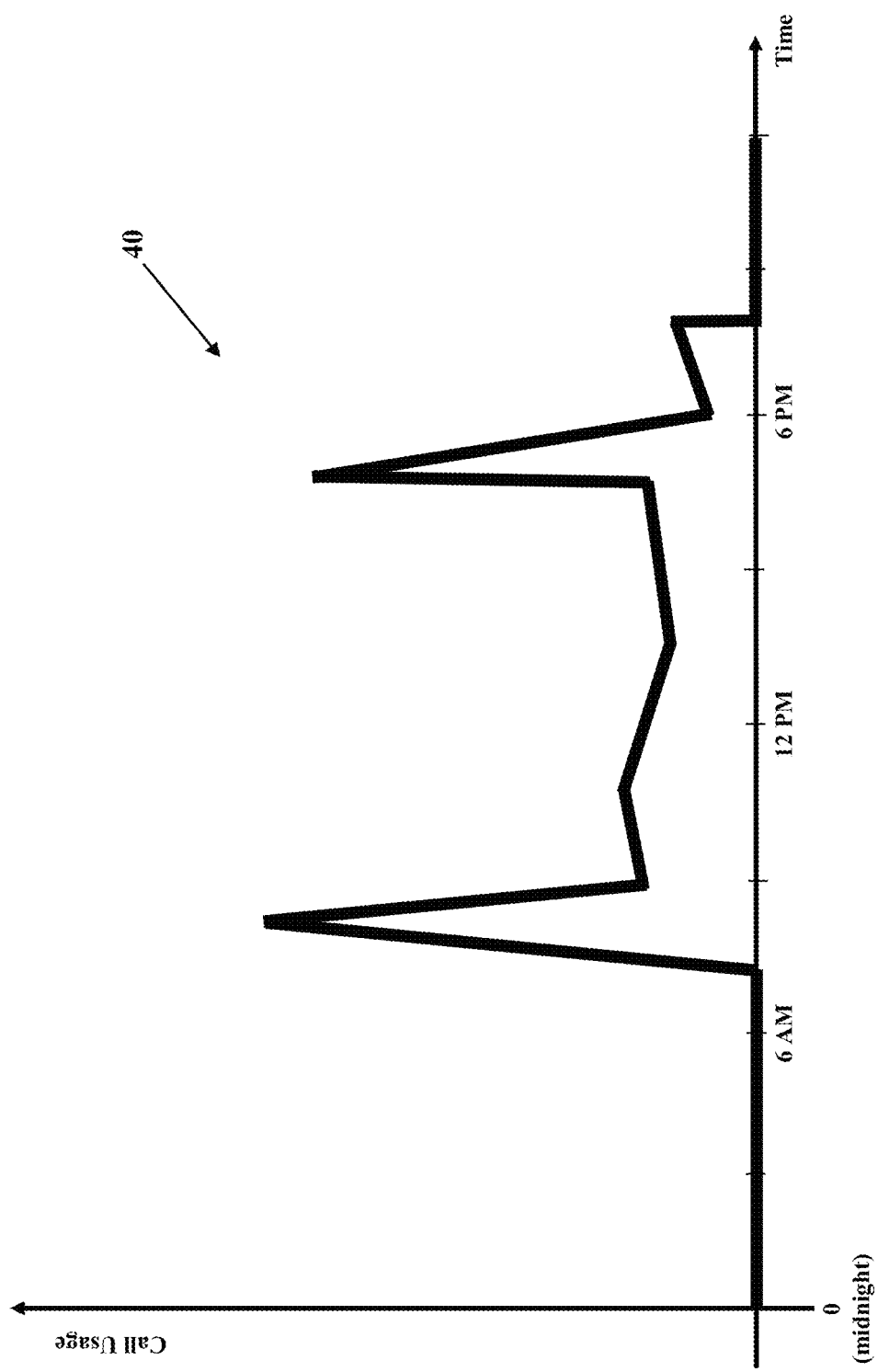
FIGS. 3-9 are graphs illustrating a calendric pattern, according to exemplary embodiments.

FIG. 3, for example, illustrates a graphical plot of one day's call usage 40 of the mobile device 12. That is, exemplary embodiments monitor how, and when, the mobile device 12 is used to make and receive calls (e.g., telephony and/or VoIP). As FIG. 3 illustrates, the mobile device 12 has no call usage 40 from midnight to 7 AM. That is, no calls are sent or received during early morning hours. At 7 AM, though, the call usage 40 dramatically increases, indicating heavy usage in the hour between 7 AM and 8 AM. Starting at 8 AM, though, call usage 40 is less throughout the remaining morning hours and afternoon hours. At 5 PM, call usage 40 again increases until 6 PM. After 8 PM, call usage falls to zero (0).

Any measure of the call usage 40 may be used. Calls per hour, or duration per hour, may be tracked. As the mobile device 12 sends and receives calls, exemplary embodiments may track the number of calls per unit of time (such as per hour). However, exemplary embodiments may additionally or alternatively track a duration of calls each hour, again whether made/sent or received. That is, exemplary embodiments may time a duration of each call that is sent from, or received by, the mobile device 12. The various durations of the calls may then be summed on an hourly basis. A total duration of calls per hour may then be tracked to determine hourly call usage 40 of the mobile device 12. However call usage 40 is tracked, exemplary embodiments may discern daily times that calls are sent from, or received by, the mobile device 12.

However the call usage 40 is tracked, the battery 16 should be charged to satisfy this call usage 40. Because the mobile device 12 experiences heavy call usage between 7 AM and 8 AM, the battery (illustrated as reference numeral 16 in FIGS. 1-2) should have a sufficient charge to ensure operation during these hours. Likewise, the battery 16 should have sufficient charge for the heavy call usage seen between 5 PM and 6 PM. If the battery 16 lacks sufficient charge, the mobile device 12 may not be able to complete the calls.

Figure 4:
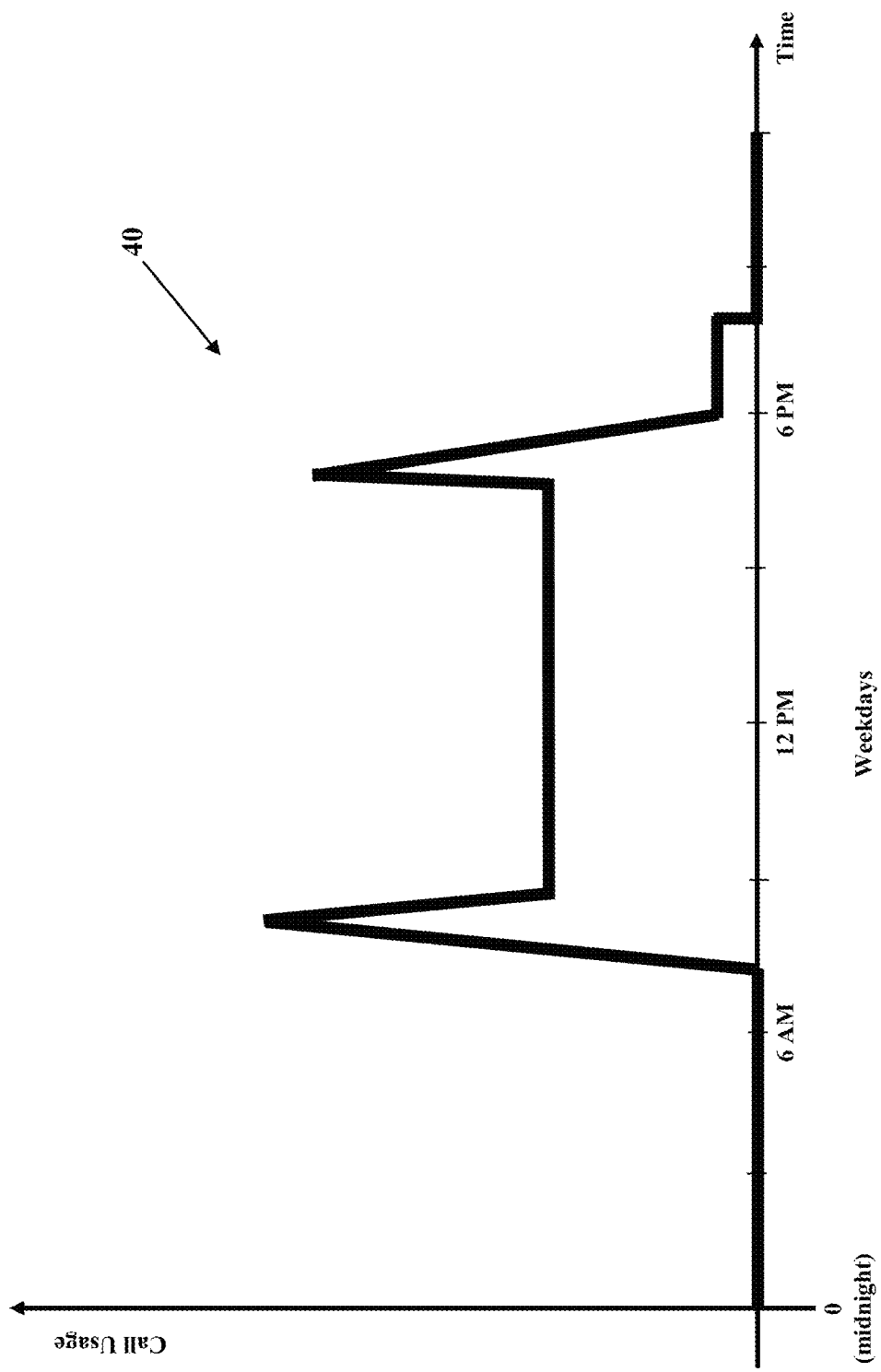

FIG. 4 illustrates long-term trends in the call usage 40. As the call usage 40 is collected for days, weeks, and even months, data can be analyzed for habitual usage. That is, the call usage 40 may be monitored to determine days and times that calls are routinely, even habitually, made. As FIG. 4 illustrates, for example, the call usage 40 is normally high on weekdays between 7-8 AM and between 5-6 PM. These hours may reflect commuting times in which many calls are made while driving or riding. No calls, however, are normally made during late night time hours, presumably when the user is sleeping. Calls are routinely made during work hours, but the usage is lower than commuting times.

Figure 5:
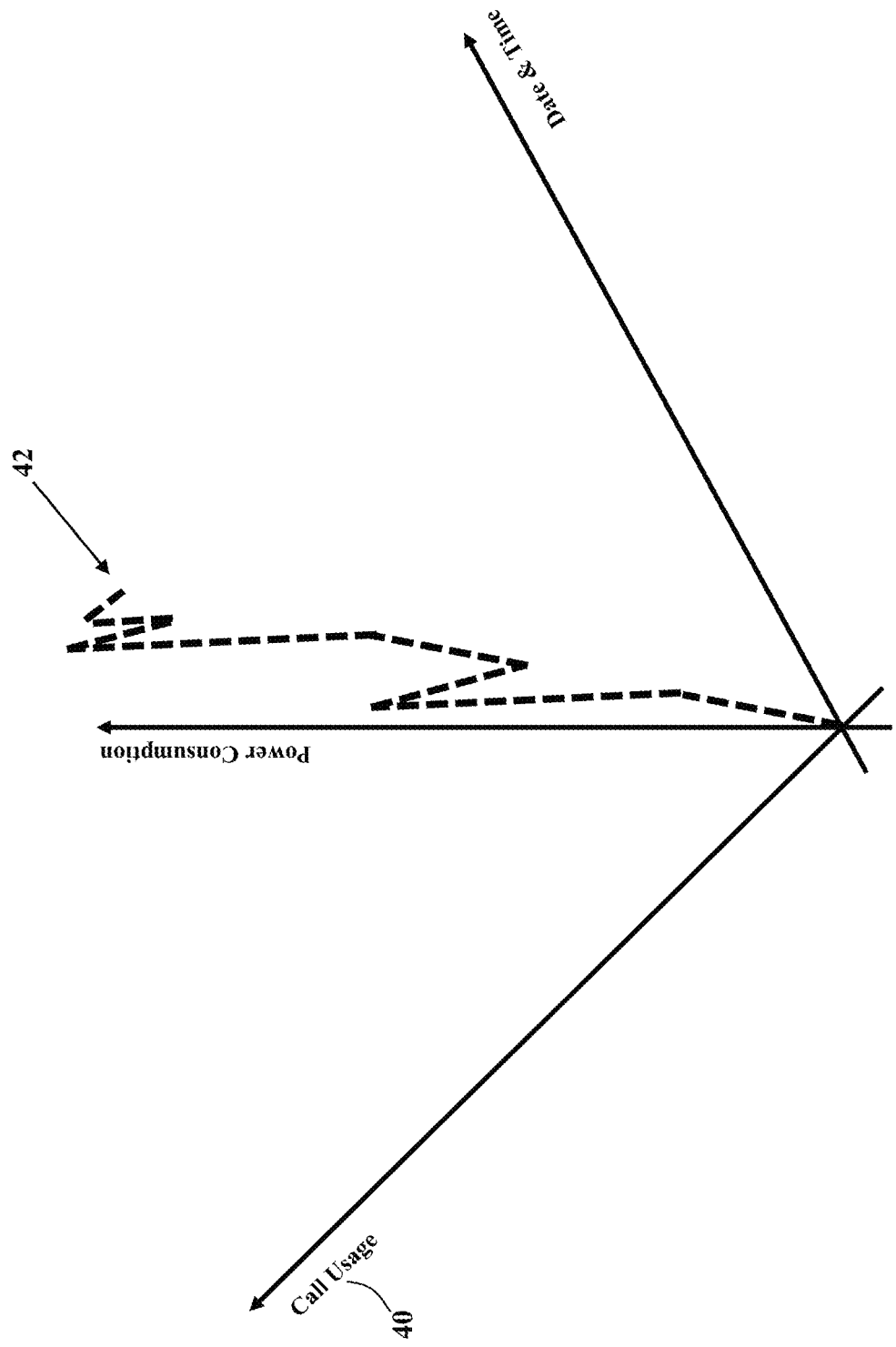

FIG. 5 illustrates concomitant power consumption 42. As the mobile device 12 is used throughout the day, electrical power is consumed from the battery 16. Exemplary embodiments may thus monitor the power consumption 42 from the battery 16 during any and all usage of the mobile device 12. That is, as the mobile device 12 is used for calls, exemplary embodiments may measure and track the power consumption 42 from the battery 16. Over time, then, exemplary embodiments determine the average power consumed from the battery 16 during the habitual call usage 40. FIG. 5 thus illustrates a three-dimensional graphical plot of this habitual power consumption 42 on an hourly basis.

Figure 6:
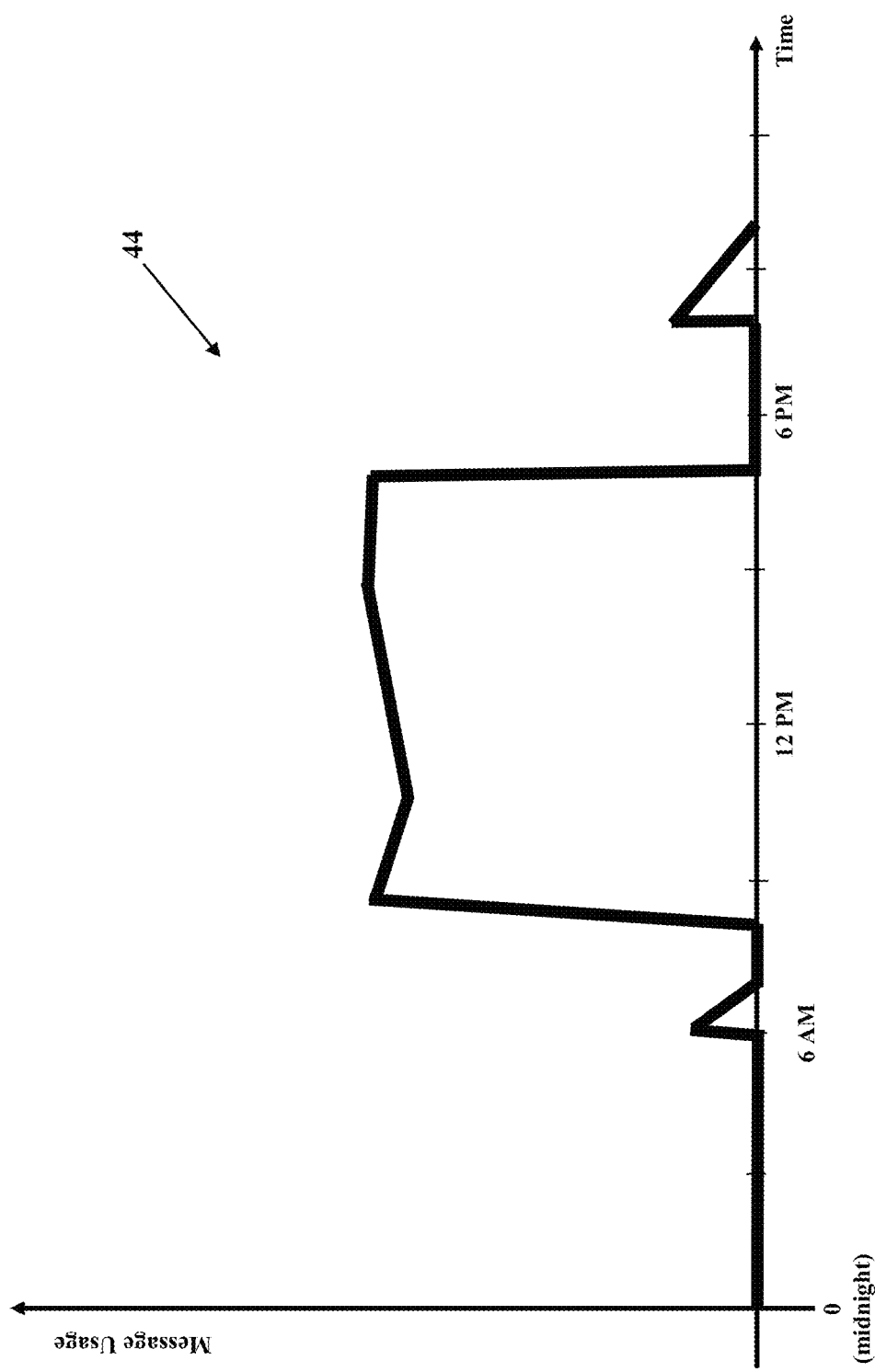
Figure 7:
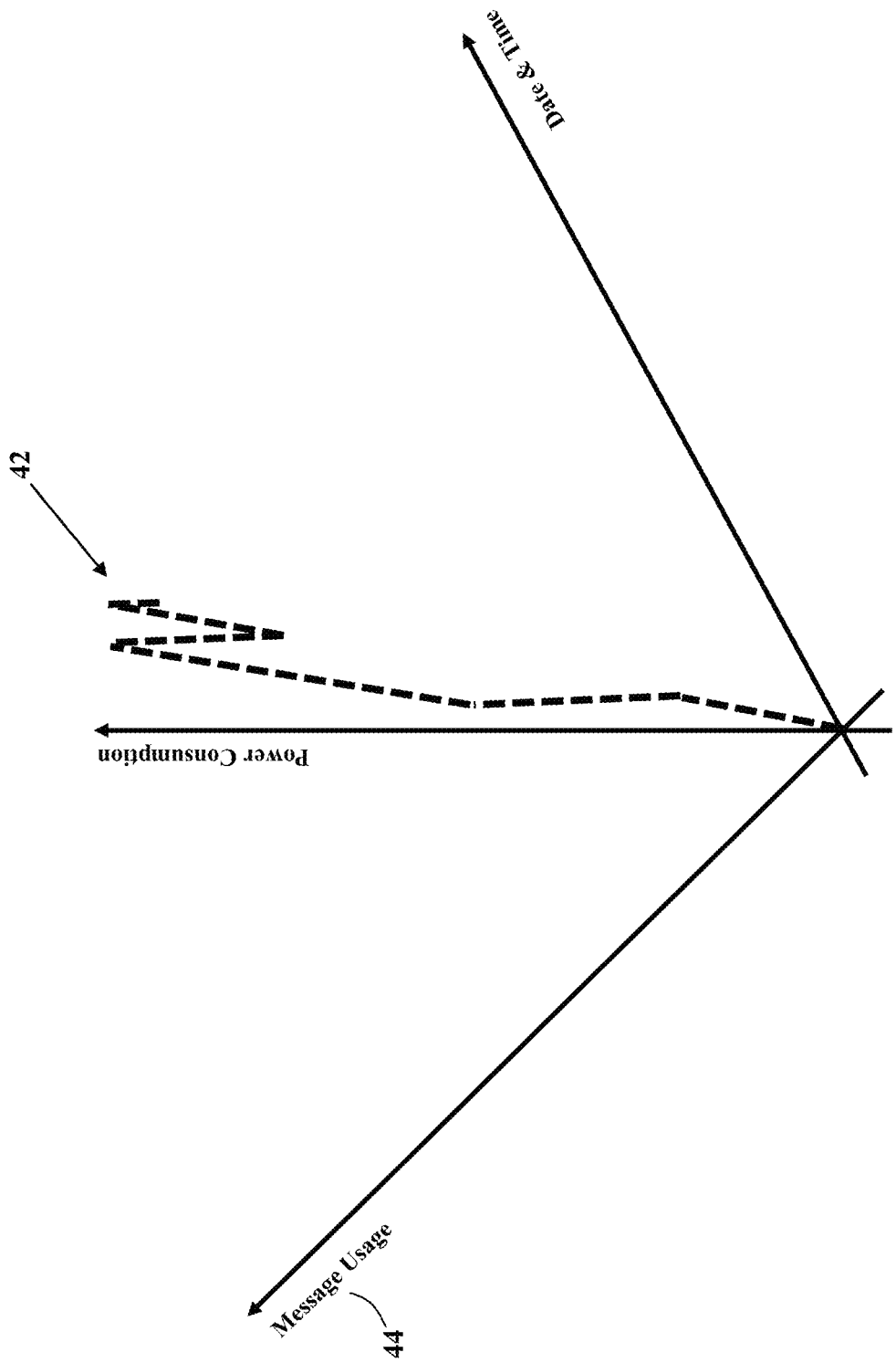

FIGS. 6-7 illustrate electronic messaging. As the mobile device 12 sends and receives electronic messages (e.g., emails and text messages) throughout the day, exemplary embodiments may track electronic message usage 44. FIG. 5 thus illustrates one day's electronic message usage 44 of the mobile device 12. The number of electronic messages per hour, for example, is one indicator of the message usage 44. Exemplary embodiments may log the date and time each message is sent and/or received. Exemplary embodiments may also sum the number of electronic messages that are sent from the mobile device 12, and/or received at the mobile device 12, during each hour of the day. The number of electronic messages per hour may thus be an adequate indicator of how and when the mobile device 12 is used.

Likewise, long-term electronic messaging is monitored. As the message usage 44 is collected for days, weeks, and months, the message usage 44 may determine days and times that messages are typically sent and/or received. FIG. 7 thus illustrates another three-dimensional graphical plot of the long-term hourly power consumption 42 from the battery 16 during electronic messaging. The charging strategy 34 may thus be developed to ensure the battery 16 always has sufficient charge to ensure habitual use is available.

Figure 8:
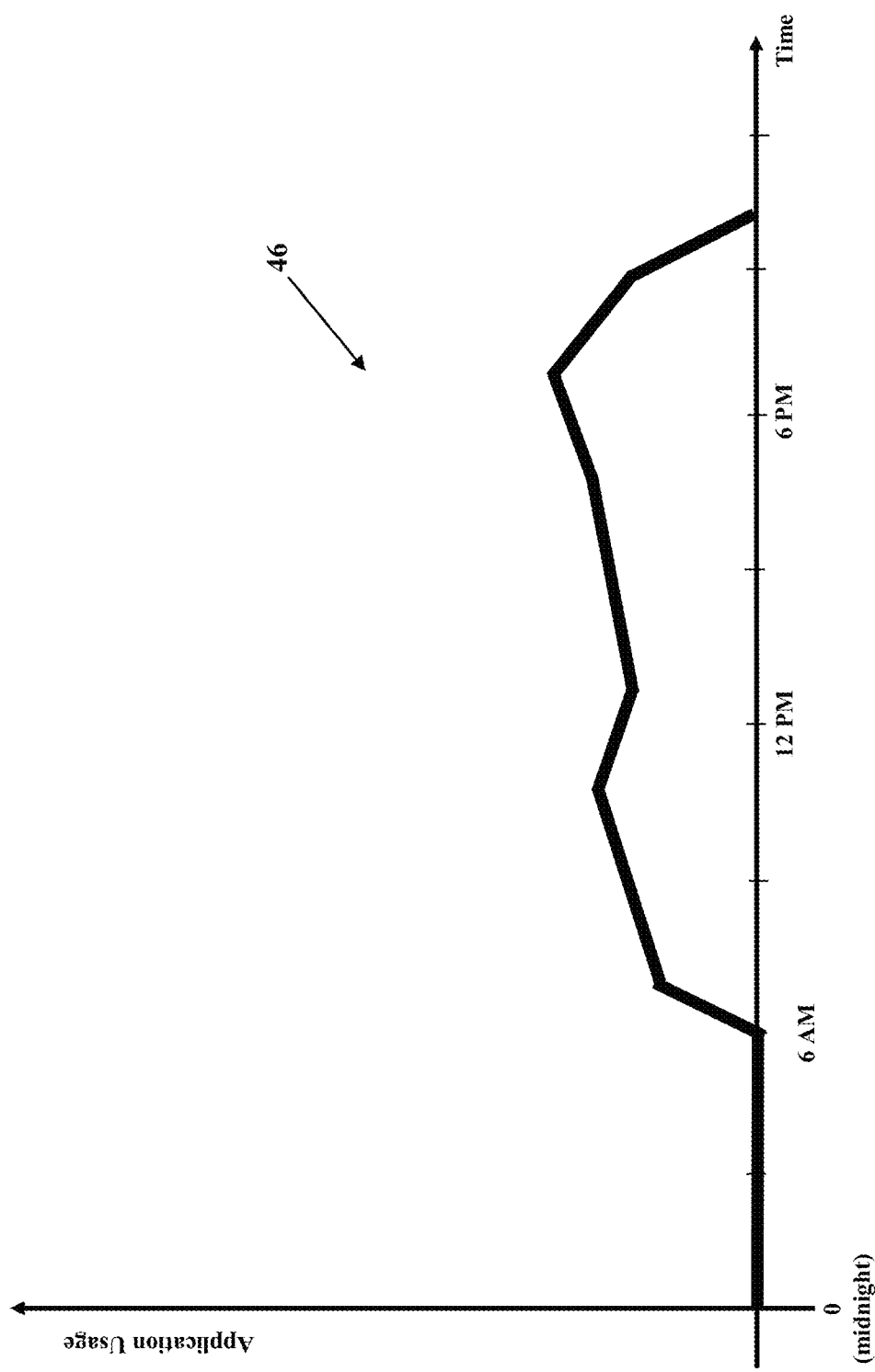

FIG. 8 illustrates application usage 46. As the mobile device 12 is used to play games, watch videos, or surf the Internet, exemplary embodiments may monitor which software application is being used (or running) and times of that use. As earlier paragraphs explained, the application usage 46 may be tracked on an hourly basis and then long-term trends may be determined. For example, from midnight to 7 AM the mobile device 12 has no usage of software applications. At 7 AM, though, a single application predominates (perhaps related to the heavy call usage). At 8 AM, multiple applications are seen throughout the day, but at 5 PM the single application again predominates. After 6 PM a few applications have nearly constant usage (perhaps indicating video content is being watched). After 10 PM, application usage falls to zero (0).

Figure 9:
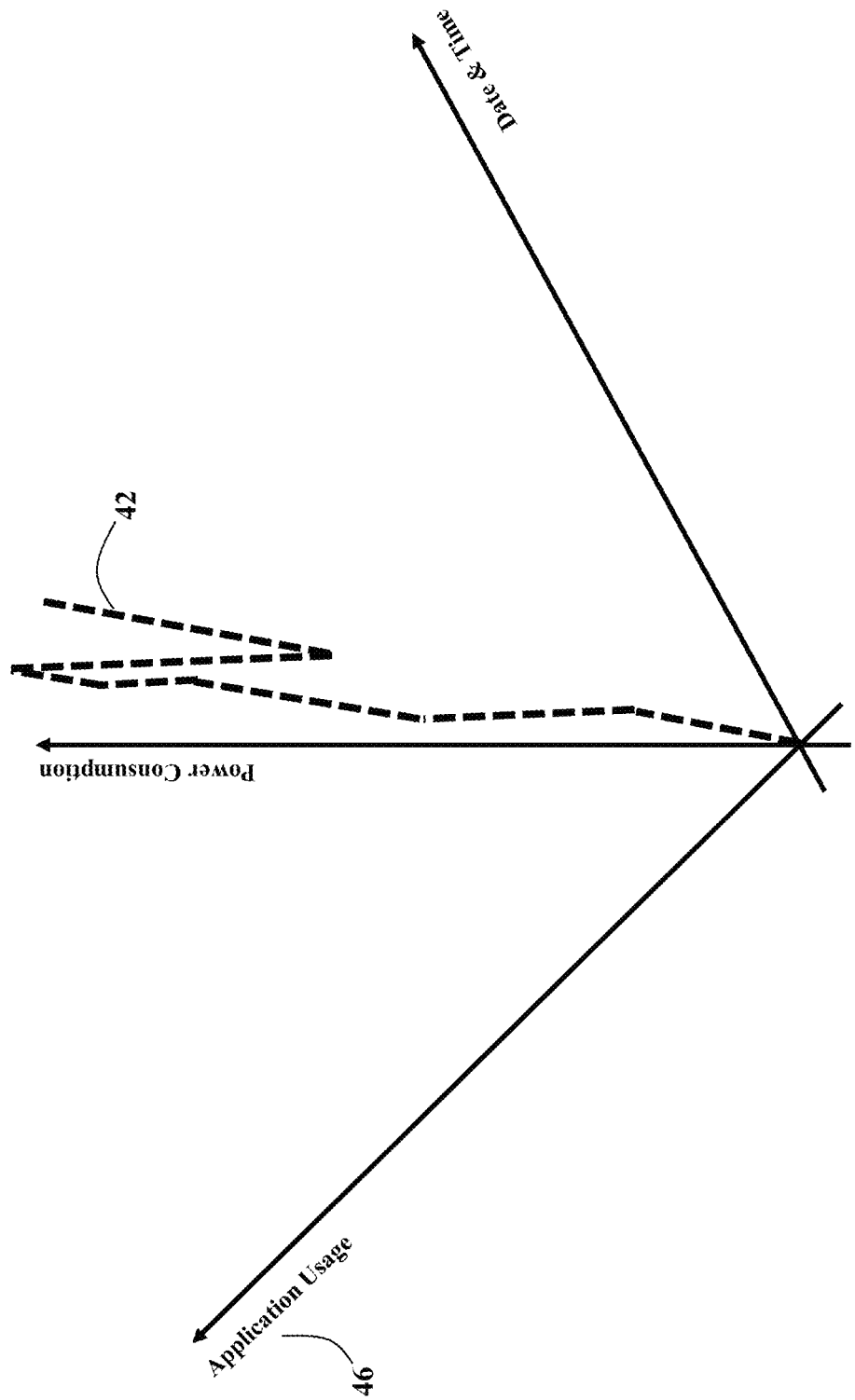

FIG. 9 thus illustrates the concomitant power consumption 42. As the software applications are used throughout the day, electrical power is consumed from the battery 16. Exemplary embodiments may thus monitor the power consumption 42 from the battery 16 during any and all application usage. That is, as any software application is called, invoked, or used, exemplary embodiments may measure and track the consumption of electrical power from the battery 16. FIG. 8 thus illustrates another three-dimensional graphical plot of the long-term hourly power consumption 42 from the battery 16 during application usage. The charging strategy 34 may thus be developed to ensure the battery 16 always has sufficient charge to ensure the mobile device 12 is available for this habitual use.

FIGS. 3-9 thus provide visual comparisons of usage requirements. FIGS. 3-4 illustrate daily, habitual heavy call usage 40 between 7 AM and 8 AM, which begins to concomitantly drain significant electrical power from the battery (as FIG. 5 illustrates). Calls are also heavier between 5 PM and 6 PM, reflecting significant power consumption 42 during afternoon commutes. Electronic messaging predominates during the day, so the battery 16 experiences a lesser but constant power consumption 42 (as FIGS. 6-7 illustrate). At 7:30 PM, though, power consumption 42 spikes (as FIGS. 8-9 illustrate), perhaps indicating both messaging and video viewing during evening hours. After 10 PM the battery 16 experiences a steady but small drain, reflecting little or no usage during sleeping hours.

The illustrations of FIGS. 3-9 may be repeated on a daily, weekly, and monthly basis. As previous paragraphs explained, exemplary embodiments may track usage over many days to learn how and when the mobile device 12 is habitually used. If memory permits, calendric usage may be monitored for even longer periods of time (such as months or even years) to discern the recurring calendric pattern 30. This historical log of usage may thus be used to determine the calendric pattern 30 that describes dates and times of recurring or repeating usage of the mobile device 12. As the mobile device 12 is used over days and weeks, specific dates and times of usage may be monitored, along with the concomitant power consumption 42 on a daily, and even hourly, basis. The calendric pattern 30, for example, may describe not only habitual days and times of usage, but also the accompanying consumption of power from the battery 16.

Figure 10:
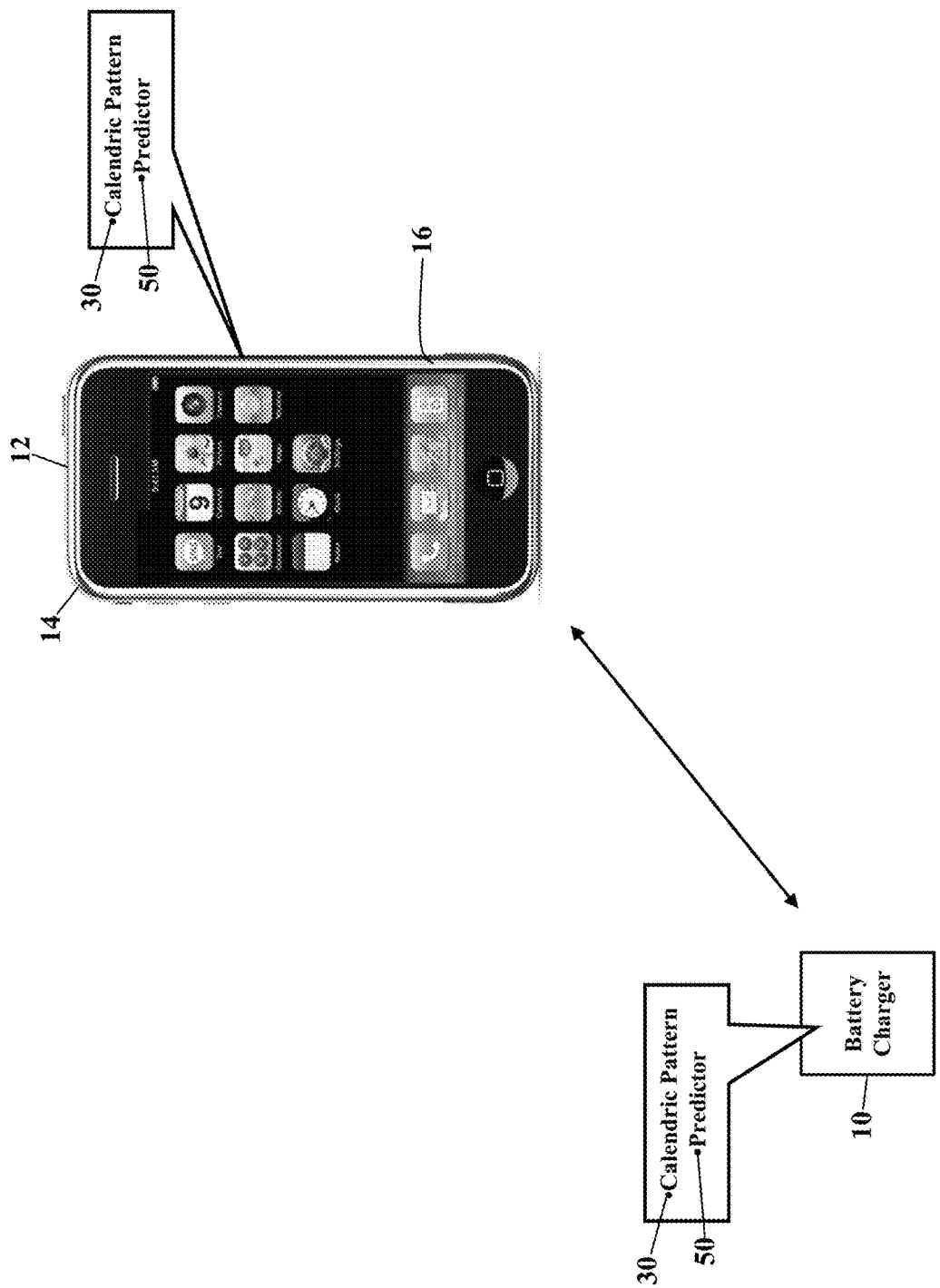
FIG. 10 is a schematic illustrating predictions of future usage and consumption, according to exemplary embodiments.

FIG. 10 is a schematic illustrating predictions of future usage and consumption, according to exemplary embodiments. Once the calendric pattern 30 is observed, future usage may be predicted. Because the calendric pattern 30 describes habitual usage of the mobile device 12, a predictor 50 may use the calendric pattern 30 to predict how the mobile device will be used in the future. For example, because the calendric pattern 30 reveals daily, heavy call usage weekday mornings and evenings, the predictor 50 may assume similar power consumption 42 during future weekday mornings and evenings. For any hour of any day, the calendric pattern 30 may be used to predict future usage of the mobile device 12 and future power consumption from the battery 16.

Figure 11:
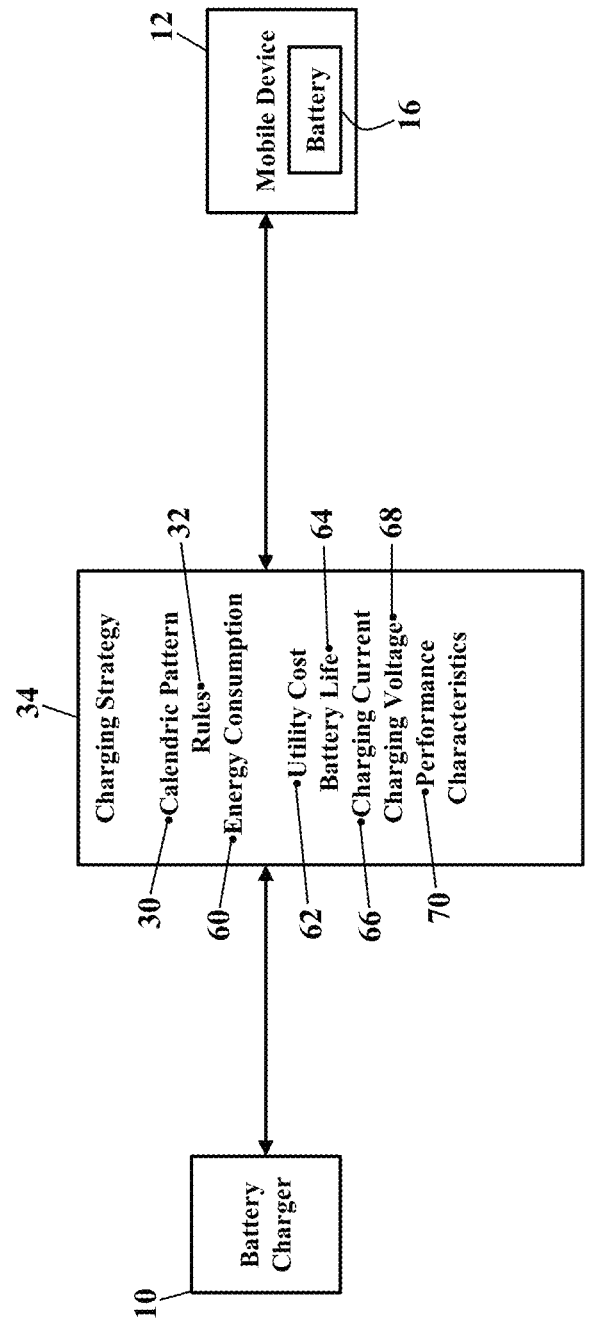
FIG. 11 is a schematic illustrating a charging strategy, according to exemplary embodiments.

FIG. 11 is another schematic illustrating the charging strategy 34, according to exemplary embodiments. Because future usage can be predicted from the calendric pattern 30, exemplary embodiments may then determine future needs from the battery 16. That is, exemplary embodiments may predict how much electrical power will be required from the battery 16, on an hourly basis, to satisfy predicted future usage. Again, because habitual usage and the concomitant power consumption (illustrated as reference numeral 42 in FIGS. 3-9) is known, exemplary embodiments may also predict how much electrical power will be consumed from the battery 16, based on the calendric pattern 30. The battery 16 must thus have a sufficient charge to ensure operation according to the habitual calendric pattern 30. The charging strategy 34 may thus be developed to ensure the battery 16 is sufficiently charged for the predicted usage.

The charging strategy 34, however, may consider the one or more rules 32. A trivial rule always ensures the battery 16 has a full charge. If the battery 16 is constantly charged, though, energy and money may be wasted. Charging the battery 16 costs money, so the charging strategy 34 may have the rules 32 to reduce, or even minimize energy consumption 60, reduce a utility cost 62, and/or to maximize a battery life 64. The battery charger 10, for example, may be instructed to ensure the battery 16 is charged no more than necessary to meet the calendric pattern 30, in order to conserve energy and costs. For example, if a seventy percent (70%) daily charge is adequate to satisfy the calendric pattern 30, then energy and money are wasted by fully charging (e.g., 100%) the battery 16. Moreover, utility rates may very during the day, with rates typically lowest during night time hours. The rules 32 may thus require a minimum cost of recharging while still satisfying the calendric pattern 30. The charging strategy 34 may thus develop an hourly, or by minute, charging current 66 and voltage 68 that satisfies the calendric pattern 30, but that minimizes cost. The charging strategy 34 may thus query for, retrieve, and compare utility rates during different times of day. The charging strategy 34 may even decline charging during times of high utility rates and, instead, prioritize charging during times of lower rates (such as nighttime hours).

The life 64 of the battery 16 may also be considered. As the battery 16 is charged and discharged, the life 64 of the battery 16 may be reduced. The life 64 may be influenced by a number of charging cycles, ambient temperature, and even levels of discharge and recharge. The charging strategy 34 may thus query for and retrieve performance characteristics 70 associated with the battery 16. The charging strategy 34 may thus implement a rule 32 that satisfies the calendric pattern 30 but that also best preserves the life 64 of the battery 16.

Figure 12:
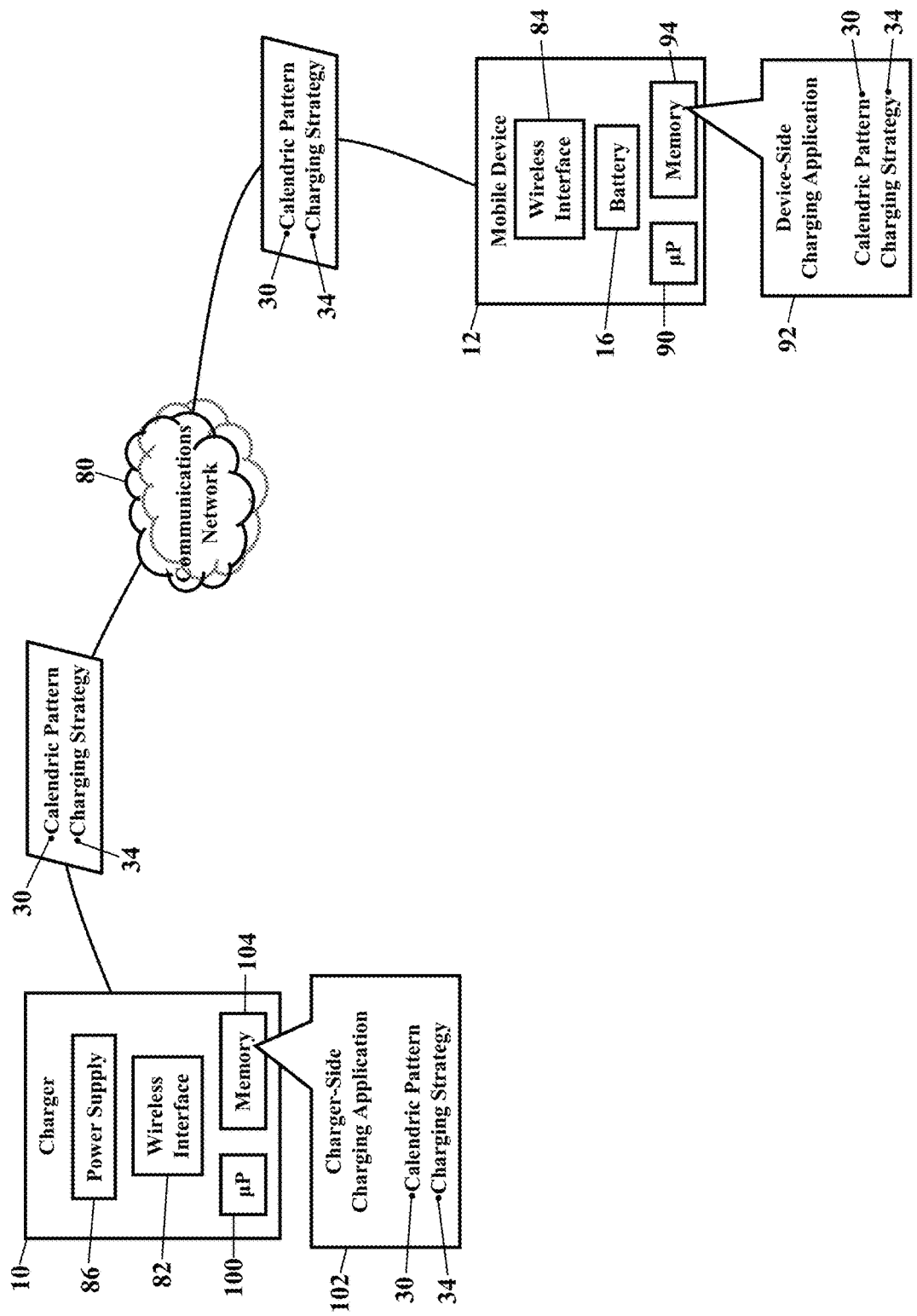
FIGS. 12-13 are more detailed block diagrams that further illustrate the operating environments, according to exemplary embodiments.
Figure 13:
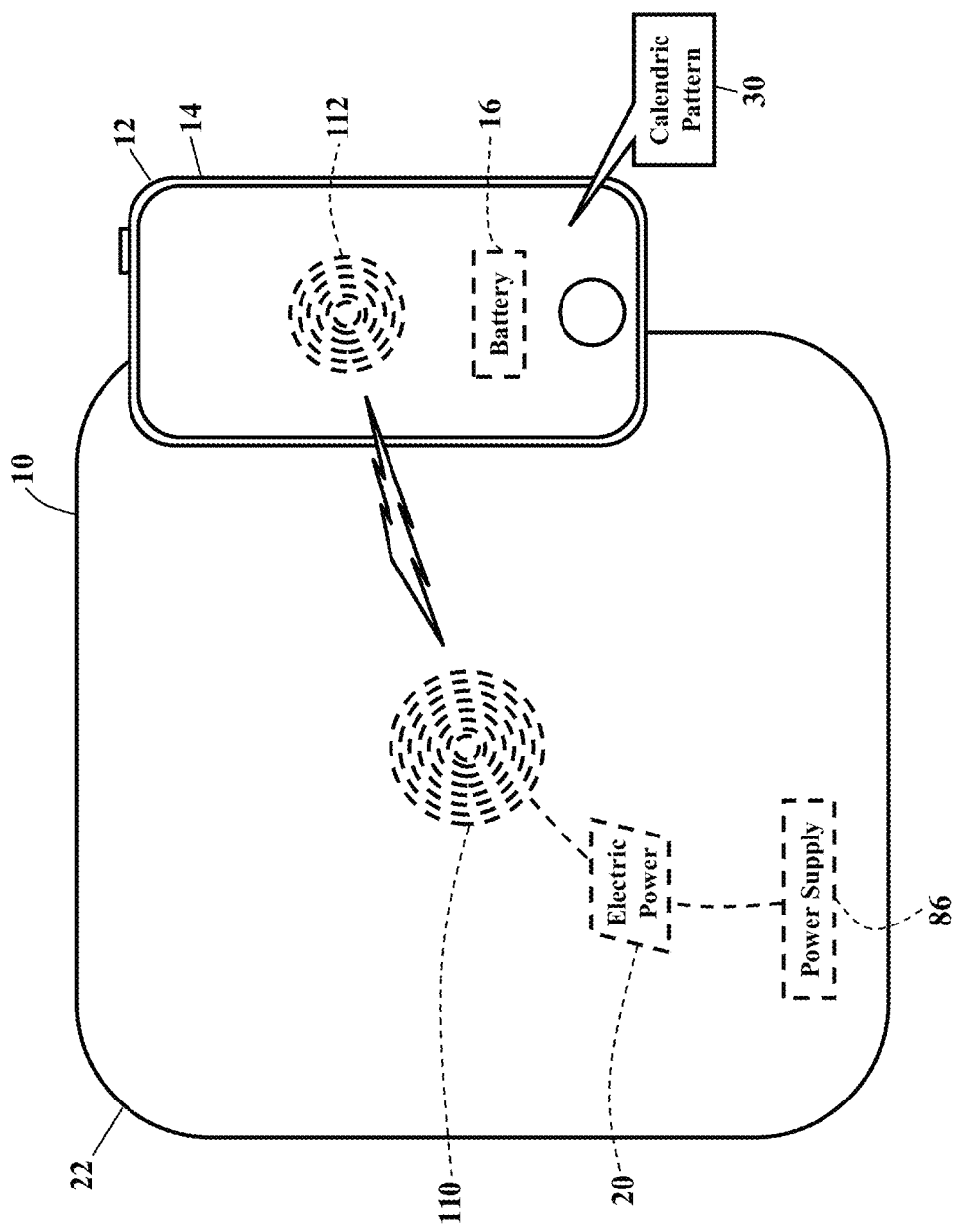

FIGS. 12-13 are more detailed block diagrams that further illustrate the operating environment, according to exemplary embodiments. Here the battery charger 10 and the mobile device 12 may establish communication over a communications network 80 to exchange information. The battery charger 10 and the mobile device 12, for example, may communicate using a physical connection (such as the physical charging cord 18 illustrated in FIG. 1). The battery charger 10 and the mobile device 12, however, may additionally or alternatively wirelessly communicate using wireless interfaces 82 and 84. The wireless interfaces 82 and 84 may be one or more transmitters and/or receivers ("transceivers"), but exemplary embodiments may use any means of wireless transmission and/or reception of signals. However communication is established, the calendric pattern 30 is retrieved and used to determined the charging strategy 34 for the battery 16. A power supply 86 receives the electrical power 20, and the charger 10 transfers the electric power 20 to the mobile device 12.

The calendric pattern 30 may be locally stored in the mobile device 12. As FIG. 12 illustrates, the mobile device 12 has a processor 90 (e.g., "µP"), application specific integrated circuit (ASIC), or other component that executes a device-side charging application 92 stored in a memory 94. The device-side charging application 92 is a set of programming, code, or instructions that cause the processor 90 to retrieve the calendric pattern 30 from the memory 94. The device-side charging application 92 may then analyze the calendric pattern 30 to determine the charging strategy 34 for the battery 16. The device-side charging application 92 may then cause the processor 90 to send the calendric pattern 30 and/or the charging strategy 34 to the battery charger 10. When the battery charger 10 receives the charging strategy 34, the battery charger 10 transfers the electrical power 20 to the mobile device 12, according to the charging strategy 34.

The calendric pattern 30, however, may also be stored in the charger 10. When the charger 10 and the mobile device 12 establish communication, the charger 10 may query for and retrieve the calendric pattern 30. That is, once the charger 10 identifies the mobile device 12, the charger 10 may query a local or remote database for the corresponding calendric pattern 30. The charger 10 may have a processor 100 (e.g., "µP"), application specific integrated circuit (ASIC), or other component that executes a charger-side charging application 102 stored in a memory 104. The charger-side charging application 102 is a set of programming, code, or instructions that cause the processor 100 to retrieve the calendric pattern 30 associated with the mobile device 12. The charger-side charging application 102 and/or the device-side charging application 92 may then cooperate and analyze the calendric pattern 30 to determine the charging strategy 34 for the battery 16. The charger-side charging application 102 may then cause the processor 100 to transfer the electrical power 20 to the mobile device 12, according to the charging strategy 34.

Exemplary embodiments may be applied regardless of networking environment. The communications network 80 may utilize any portion of the electromagnetic spectrum and any signaling standard (such as any of the I.E.E.E. 802 family of standards, GSM/CDMA/TDMA or any cellular standard, and/or the ISM band). The communications network 80, for example, may utilize near field, BLUETOOTH®, or WI-FI® communications to establish or convey communications. The communications network 80 may also utilize a radio-frequency domain and/or an Internet Protocol (IP) domain. The communications network 80, however, may also include a distributed computing network, such as the Internet (sometimes alternatively known as the "World Wide Web"), an intranet, a local-area network (LAN), and/or a wide-area network (WAN). The communications network 80 may also physical components, such as the physical charging cord 18. Indeed, exemplary embodiments may be applied to any wireless/wireline communications network, regardless of physical componentry, physical configuration, or communications standard(s).

FIG. 13 further illustrates inductive charging of the battery the battery charger 10. As those of ordinary skill in the art understand, the battery charger 10 and the mobile device 12 may inductively couple to inductively charge the battery 16. A user merely lays the mobile device 12 on or near the charger 10, and the battery 16 is wirelessly charged using electromagnetic induction. As FIG. 13 illustrates, the battery charger 10 may be configured as the pad 22. The pad 22 includes at least one primary coil 110. The power supply 86 provides the electrical power 20 (e.g., voltage and current) to the primary coil 110. When the electrical power 20 exhibits alternating current (e.g., sinusoidal) characteristics, some of the electrical power 20 propagates from the primary coil 110 as an electromagnetic field. If the mobile device 12 has a secondary coil 112, the electromagnetic field induces electrical voltage in the secondary coil 112. The mobile device 12 may thus use this induced electrical voltage to recharge the battery 16. The electrical power 20 provided by the power supply 86 may thus be used to inductively charge the battery 16 in the mobile device 12. Because inductive coupling and inductive charging are well-known, this disclosure will not dwell on the known aspects.

Radio-frequency devices may be also used. When the mobile device 12 is placed on or near the pad 22, radio-frequency devices may be used to sense or determine the proximity or presence of the mobile device 12. The mobile device 12, for example, may have an RFID (radio-frequency identification device) that activates in the presence of the pad 22. When the mobile device 12 is detected, the battery charger 10 queries the mobile device 12 to obtain its calendric pattern 30. The use of RFID with battery chargers is known, so no further explanation is needed.

Figure 14:
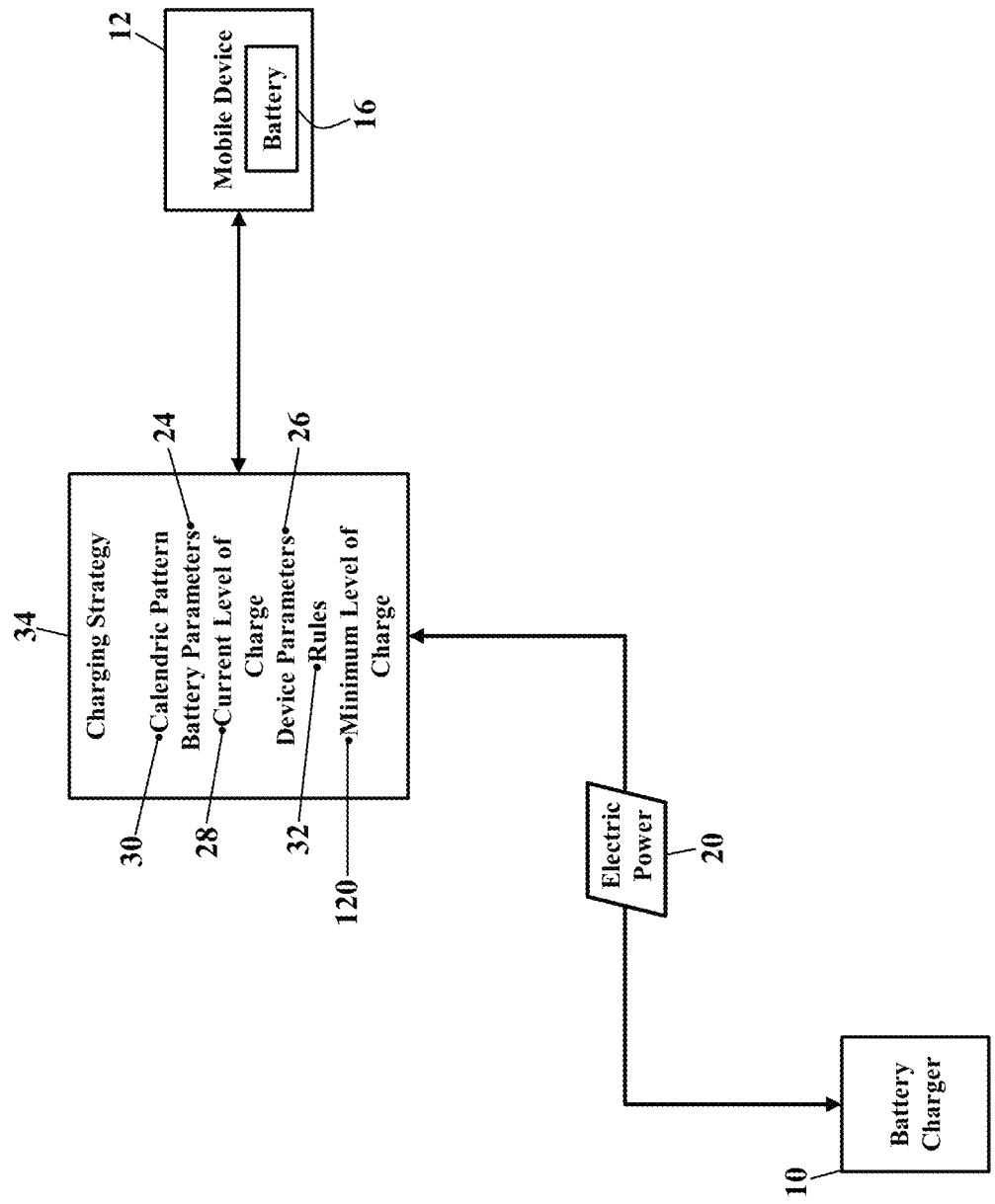
FIGS. 14-15 are schematics further illustrating the charging strategy, according to exemplary embodiments.
Figure 15:
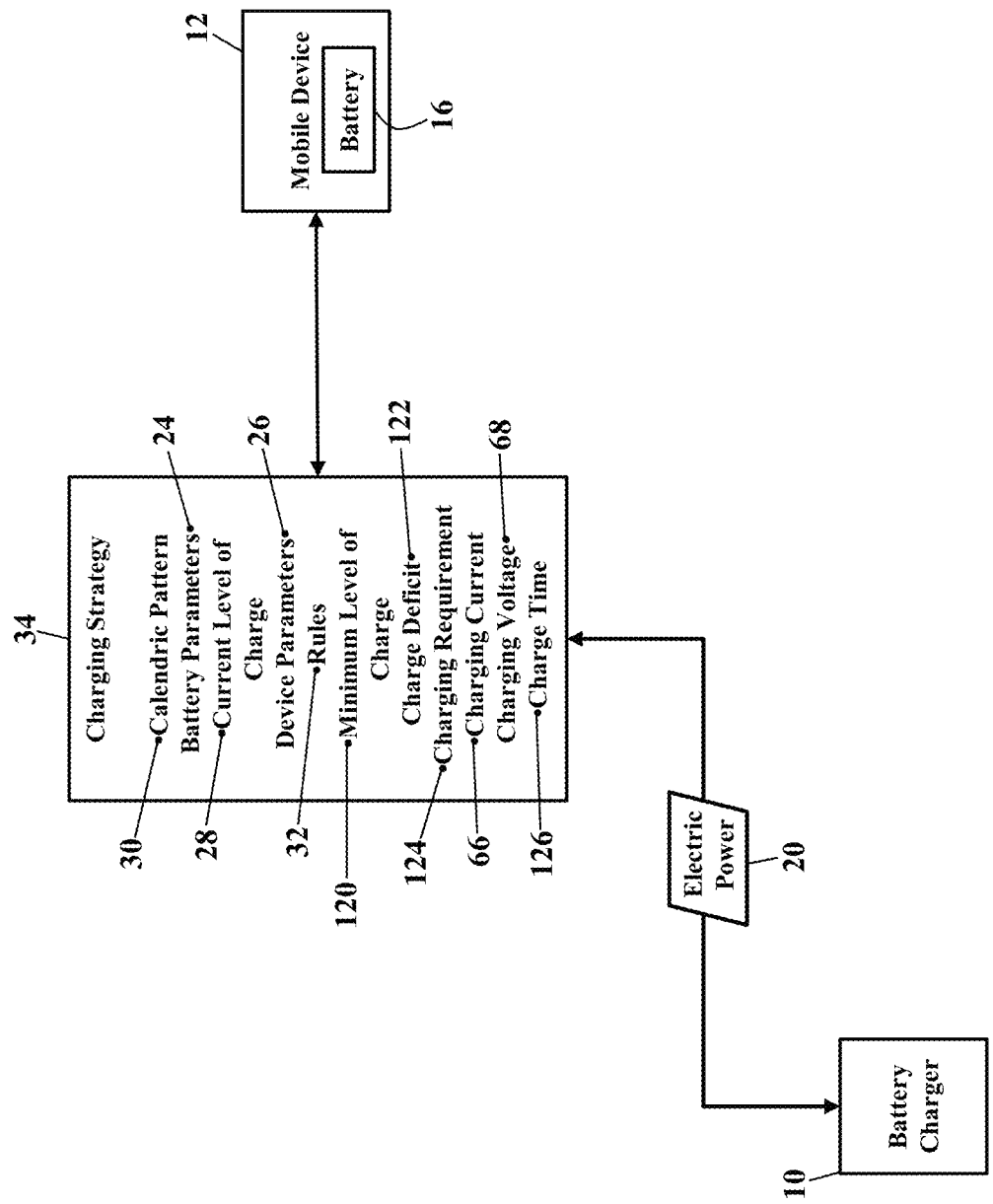

FIGS. 14-15 are schematics further illustrating the charging strategy 34, according to exemplary embodiments. Whether the battery charger 10 and the mobile device 12 establish wired or wireless communication, information is exchanged. As previous paragraphs explained, the calendric pattern 30 may be sent from the mobile device 12 to the battery charger 10. The calendric pattern 30 describes dates and/or times of repeated use. The calendric pattern 30, in other words, may describe dates and times of consistent, average, or even habitual usage. Exemplary embodiments may then predict future usage, based on the calendric pattern 30.

Other information may be exchanged. As FIG. 14 illustrates, when the battery charger 10 and the mobile device 12 establish communication, the battery parameters 24 may be retrieved and exchanged. The charger 10 and/or the mobile device 12, for example, may retrieve the type of the battery 16, such as the battery's chemical composition, manufacturer, and/or model. The battery parameters 24 may also include the current level 28 of charge that describes a current condition or state of the battery 16. The device parameters 26 may also be retrieved, such as the make, model, and serial number of the mobile device 12. The rules 32 may also be retrieved that logically describe objectives or mandates for charging the battery 16 in the mobile device 12.

Exemplary embodiments determine the charging strategy 34. Once information is obtained, the charging strategy 34 may be developed. For example, exemplary embodiments may determine a minimum level 120 of charge of the battery 16 that is sufficient for the calendric pattern 30. If the calendric pattern 30 indicates that only sixty percent (60%) of a full charge level is needed for a typical day's usage, then a full charge is unnecessary. Indeed, any level of charge above 60% may merely waste energy and money. So exemplary embodiments may determine the minimum level 120 of charge of the battery 16 that is sufficient for the typical daily, weekly, or monthly usage of the mobile device 12.

FIG. 15 illustrates charging requirements, according to exemplary embodiments. Once the minimum level 120 of charge of the battery 16 is determined (based on calendric usage), the current condition or state of the battery 16 is compared to the minimum level 120 of charge. If the current level 28 of charge of the battery 16 equals or exceeds the minimum level 120 of charge, then the battery 16 has sufficient charge for calendric usage. When, however, the current level 28 of charge of the battery 16 is less than the minimum level 120 of charge, then the battery 16 exhibits a charge deficit 122. The battery 16, in other words, must be charged in order to complete the calendric usage observed or predicted from the calendric pattern 30.

Exemplary embodiments may thus determine a charging requirement 124 of the battery 16. When the battery 16 has an insufficient charge, the battery 16 must be charged. The calculated charge deficit 122 thus represents a minimum amount of the electrical power 20 (supplied by the battery charger 10) that must be added to the battery 16 in order to conduct the calendric usage predicted from the calendric pattern 30. The charging requirement 124 may thus be any combination of the charging current 66 and the voltage 68 that charges the battery 16 to the minimum level 120 of charge.

Charge time 126, however, may also be a factor in the charging requirement 124. As those of ordinary skill in the art understand, the battery 16 may be quickly or slowly charged, based on many factors. If the power supply (illustrated as reference numeral 86 in FIGS. 12-13) in the battery charger 10 can only provide a small amount of the electrical power 20, then the battery 16 in the mobile device 12 may be slowly charged. When, however, the battery charger 10 can provide higher voltages and/or currents, then charging times may be quick. Also, circuitry losses reduce the electrical power 20 available to charge the battery 16. Inductive charging, for example, produces inefficiencies between the primary and secondary coils (illustrated as reference numerals 110 and 112 in FIG. 13). The battery 16 itself may have performance or charging limitations, such that only certain ranges of currents and/or voltages may be used. So, exemplary embodiments determine the optimum or preferred charging current 66 and voltage 68 over the charge time 36. The charging requirement 124 may thus exhibit those voltage, current, and time parameters that best charge the battery 16 to the minimum level 120 of charge. The charge time 126 may thus represent the time (in seconds, minutes, or hours) that will be required to charge the battery 16 from the current level 28 of charge to the minimum level 120 of charge, given the charging current 66 and voltage 68.

Figure 16:
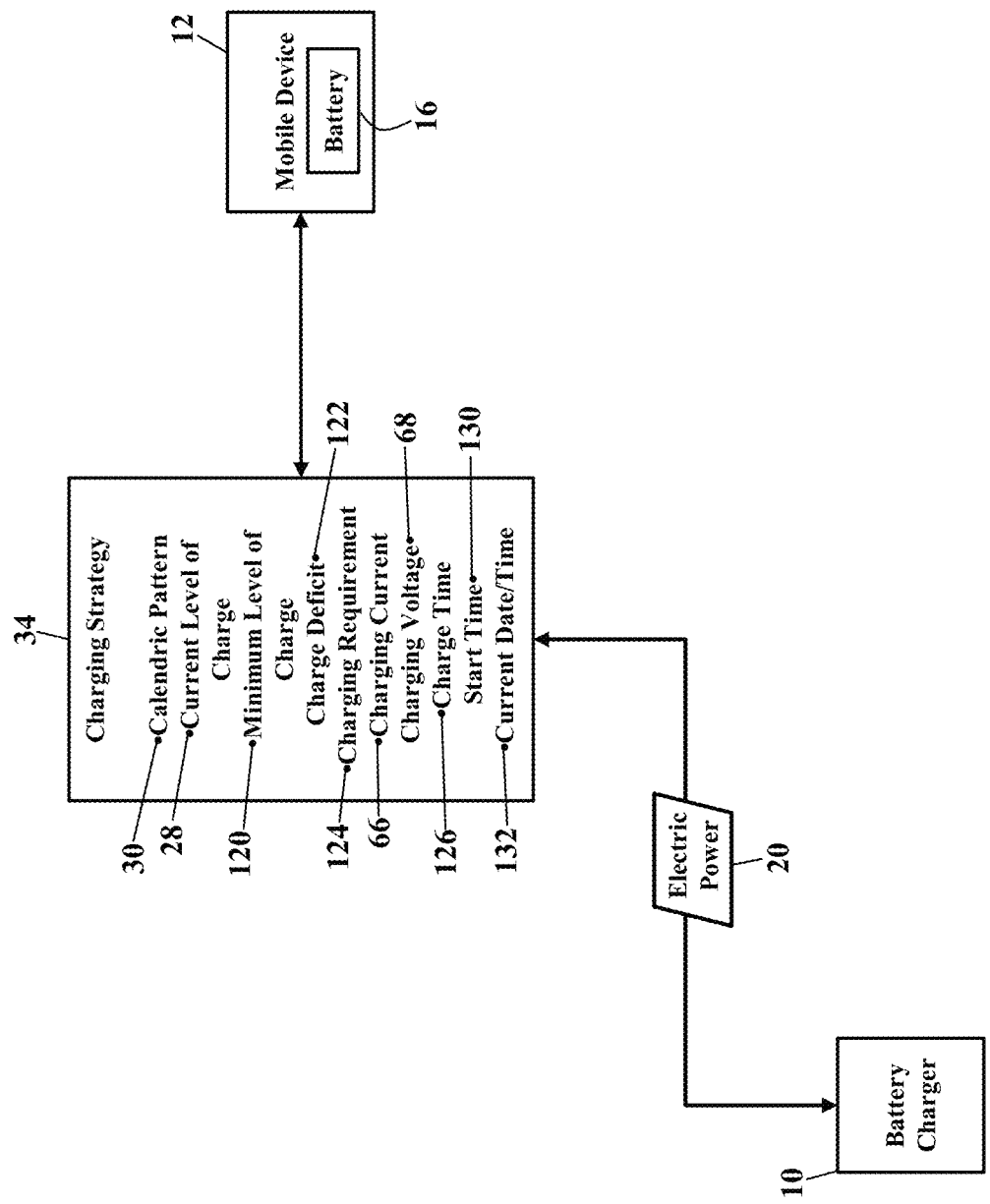
FIG. 16 is a schematic illustrating a start time for charging, according to exemplary embodiments.

FIG. 16 is a schematic illustrating a start time 130 for charging, according to exemplary embodiments. Once the charging requirements 124 are determined, the mobile device 12 and/or the battery charger 10 know the charging current 66, the charging voltage 68, and the charging time 126 that is required to charge the battery 16 to the minimum level 120 of charge. Exemplary embodiments may then again consult the calendric pattern 30 to determine when to start charging the battery 16. Because the required charging time 126 to charge the battery 16 (to the minimum level 120 of charge) is now known, the start time 130 for charging may be chosen to not conflict with the calendric pattern 30. That is, any charging should be completed and stopped in time for the typical usage observed from the calendric pattern 30.

More examples help explain the start time 130 for charging. Suppose again that the mobile device 12 exhibits heavy, daily calendric usage from 7 AM to 8 AM. If the battery 16 requires two hours of the charge time 126, then exemplary embodiments start and complete the charging before 7 AM. That is, the battery charger 10 may automatically start charging the battery 16 no later than 5 AM, in order to complete the two-hour charge by 7 AM. Exemplary embodiments may thus determine the latest start time 130 for charging by subtracting the charge time 126 from any dates and times of calendric usage observed from the calendric pattern 30. The battery charger 10 may thus continually or periodically compare a current date and time 132 to the start time 130 for charging. When the current date and time 132 equals or matches the start time 130 for charging, the battery charger 10 may be instructed to automatically begin supplying the electrical power 20 to the mobile device 12. The battery charger 10 and/or the mobile device 12 automatically stops the charging no later than a beginning of any calendric usage observed from the calendric pattern 30 (such as the 7 AM heavy usage, explained above).

Figure 17:
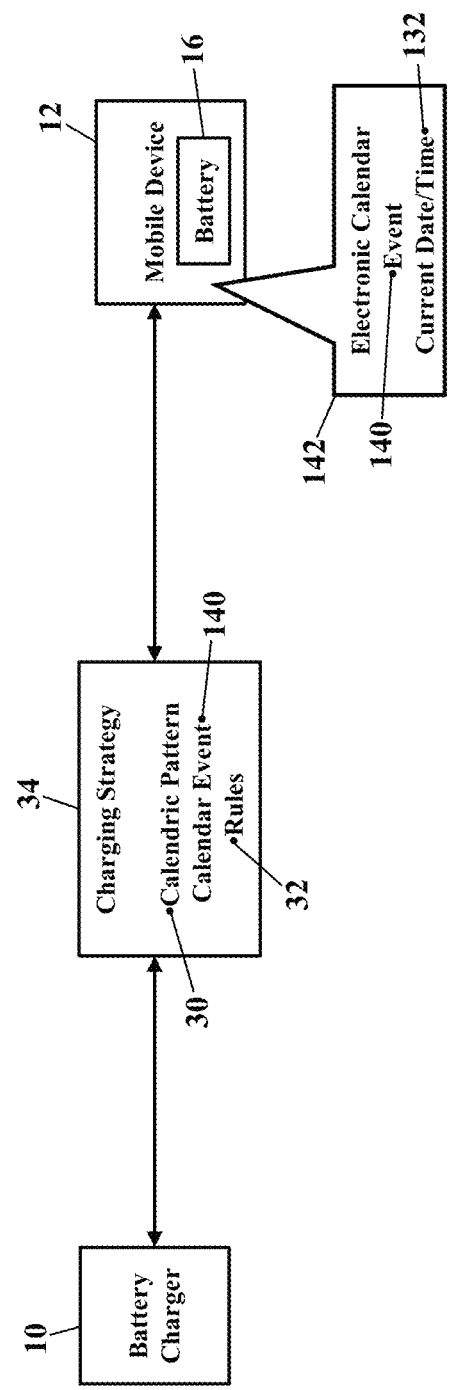
FIG. 17 is a schematic illustrating calendar interfacing, according to exemplary embodiments.

FIG. 17 is a schematic illustrating calendar interfacing, according to exemplary embodiments. Here the calendric pattern 30 may also reflect one or more calendar events 140 in an electronic calendar 142. As FIG. 17 illustrates, the mobile device 12 may store and/or execute the electronic calendar 142, thus allowing the mobile device 12 to track a user's appointments, schedules, and other entries. The electronic calendar 142 may be any calendaring application (such as MICROSOFT® OUTLOOK® or GOOGLE® Calendar). As the charging strategy 34 is developed, exemplary embodiments may retrieve one or more calendar events 140 stored by the electronic calendar 142. Exemplary embodiments may thus develop the charging strategy 34 to ensure the battery 16 is adequately charged in time for the calendar event 140.

Suppose, for example, the user has scheduled a video call for Tuesday, October 3rd at 4 PM. Exemplary embodiments may thus ensure the battery 16 has enough charge to complete the video call, based on the calendric pattern 30 associated with previous video calls. That is, the calendric pattern 30 may be searched or queried for a previous video call and an average power consumption observed during these previous video calls. The charging strategy 34 may then be determined to ensure the battery 16 has sufficient charge to complete the calendared video call. The calendar event 140 may thus describe some device activity or usage (e.g., call, electronic message, or a software application) of the mobile device that is scheduled for a future time. Exemplary embodiments retrieve the calendar event 140 and query the calendric pattern 30 for the scheduled usage. Previous matching usages, and the power consumed from the battery 16 during each matching usage, are retrieved from the calendric pattern 30. When multiple usages are retrieved, exemplary embodiments may sort or filter for the usages most similar in time. Multiple, matching entries for power consumed may be averaged. Exemplary embodiments may thus know the likely power consumed from the battery 16 during the scheduled calendar event 140. Similarly, when an upcoming calendar event 140 specifies, invokes, or calls a software application, exemplary embodiments may query the calendric pattern 30 for the software application. Previous matching uses of the software application are retrieved, along with the corresponding power consumed from the battery 16 during each matching usage. If multiple usages are retrieved, the software usage or usages most similar in time may be selected, and their corresponding multiple, matching entries for power consumed may be averaged. Again, then exemplary embodiments may predict the likely power consumed from the battery 16 during the calendar event 140.

Moreover, the calendric pattern 30 reveals other recurring uses. Recall that, in previous examples, the mobile device 12 is already known to make many calls starting at 5 PM (from the calendric pattern 30 as illustrated in FIGS. 3-5). So, by 4 PM, the battery 16 in the mobile device 12 may need sufficient charge to ensure operation during both the calendar event 140 (e.g., the scheduled video call) and the heavy call usage (illustrated as reference numeral 40 in FIGS. 3-5) starting at 5 PM.

The calendric pattern 30 may also reflect holidays and vacations. Because the calendric pattern 30 may also reflect the calendar events 140 in the electronic calendar 142, the calendric pattern 30 may obtain entries for holidays and vacations. The calendric pattern 30 may thus reflect unique usage patterns on holidays and scheduled vacations. If a particular day or event is associated with a holiday date, exemplary embodiments may query for and retrieve the calendric pattern 30 for a previous holiday (such as the previous calendar year's usage on the same holiday). If a calendar event 140 is associated with a location, exemplary embodiments may query for and retrieve the calendric pattern 30 associated with the same location or destination. If a vacation regularly occurs at the same time of year (such as Christmas or spring break), exemplary embodiments may query for and retrieve the calendric pattern 30 associated with a previous time of year. The calendric pattern 30 may thus reflect holidays and vacations associated with a user.

So the charging strategy 34 is implemented to ensure sufficient charge in the battery 16. Exemplary embodiments may ensure an adequate charge for predicted calendric usage (from the calendric pattern 30). Exemplary embodiments, however, may also look ahead and ensure adequate charge for scheduled activities in the user's electronic calendar 142. The battery charger 10 and/or the mobile device 12 may thus monitor the current time 132 of day, the condition of the battery 16, the calendric pattern 30, the rules 32, and scheduled events 140 in the electronic calendar 142. The charging strategy 34 may thus charge the battery 16 to satisfy both the upcoming calendric pattern 30 and calendar events 140 while enforcing or adhering to the rules 32.

Figure 18:
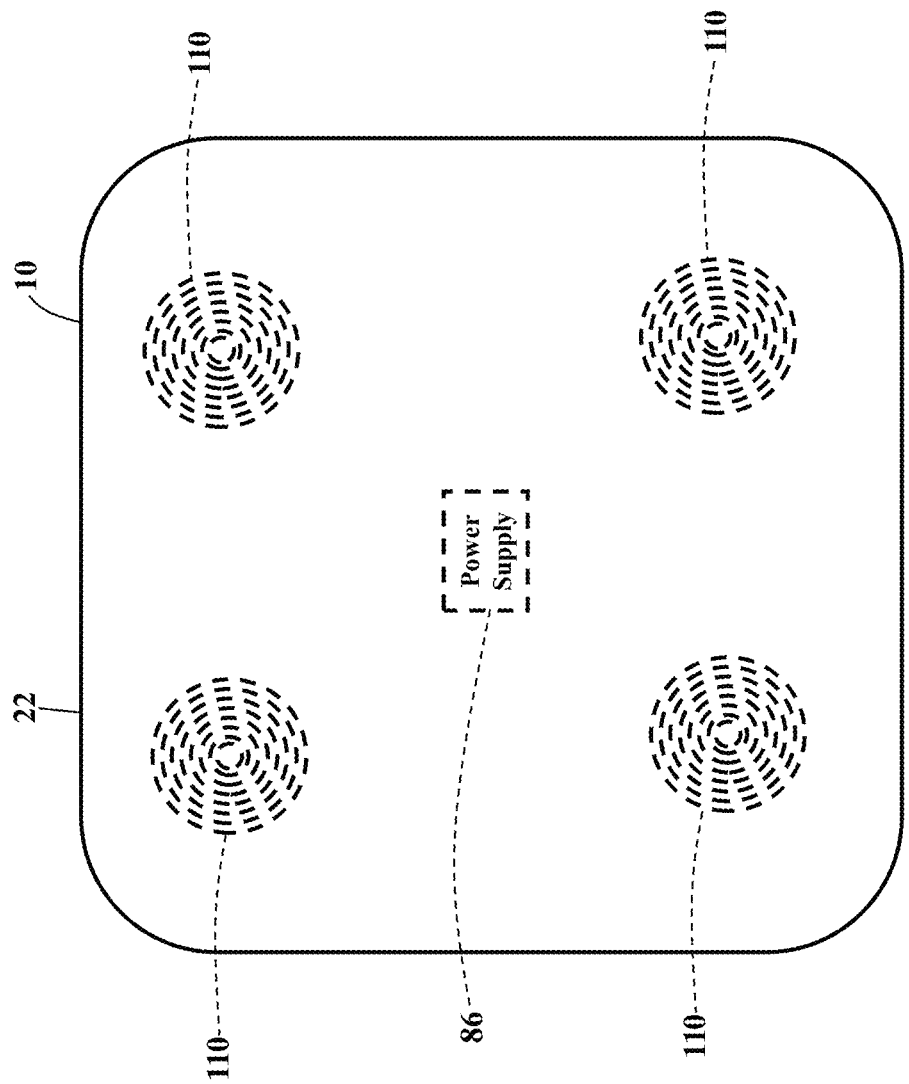
FIGS. 18-19 are schematics illustrating charging of multiple mobile devices, according to exemplary embodiments.
Figure 19:
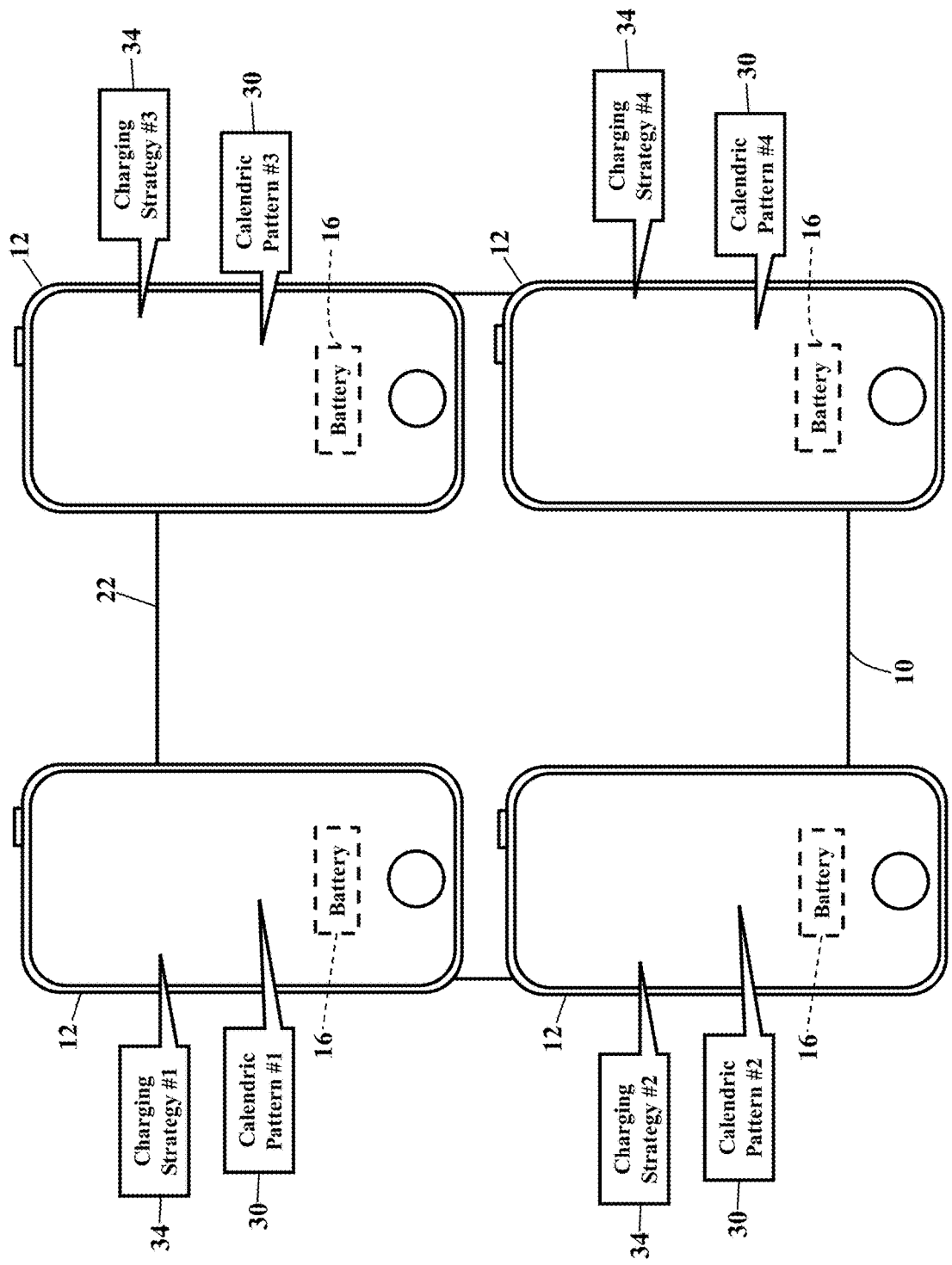

FIGS. 18-19 are schematics illustrating charging of multiple mobile devices 12, according to exemplary embodiments. Here the battery charger 10 is again illustrated as the pad 22, and FIG. 18 illustrates the pad 22 having multiple primary coils 110. Because the pad 22 has multiple primary coils 110, the pad 22 may charge multiple mobile devices 12. FIG. 19 thus illustrates multiple mobile devices 12 placed atop the pad 22. Each primary coil 110 may thus charge a different mobile device 12. So, the more primary coils 110, the more mobile devices 12 that may be charged by the pad 22. Each primary coil 110 may be separately controlled, such that each mobile device 12 may be differently charged, according to its own unique calendric pattern 30. Pads with multiple primary coils are known, though, so a greater explanation of the multiple primary coils 110 is not needed.

Here, though, each mobile device 12 may exchange its associated calendric pattern 30. Each mobile device 12 likely has different patterns of usage, so the pad 22 may determine a different charging strategy 34 for each mobile device 12. A smart phone and a tablet computer, for example, likely have different calendric patterns 34. Moreover, different users may charge their mobile devices 12 on the pad 22, and each different user's mobile device 12 has a different calendric pattern 30. So exemplary embodiments cause each mobile device 12 to sent its calendric pattern 30 to the pad 22. Each mobile device 12 may also send on or more of its upcoming calendar events (illustrated as reference numeral 140 in FIG. 17) and any of the rules (illustrated as reference numeral 32 in FIG. 17) for charging each respective mobile device 12. As the above paragraphs explained, exemplary embodiments monitor the current date and time 132, the condition of the battery 16, the calendric pattern 30, the rules 32, and the scheduled calendar events 140 associated with each mobile device 12. A unique charging strategy 34 may thus be developed for each battery 16 in each mobile device 12. Each charging strategy 34 attempts to satisfy predicted usage from the calendric pattern 30 and/or any upcoming calendar events 140, while still enforcing or adhering to each device's unique set of the rules 32. Exemplary embodiments implement each charging strategy 34 to ensure each battery 16 is adequately charged in time to satisfy each calendric pattern 30 and any upcoming calendar events 140.

The pad 22 may thus electrically drive each primary coil 110 to its associated charging strategy 34. Each individual primary coil 110, in other words, may propagate a different electromagnetic field, according to the charging strategy 34 associated with the mobile device 12 coupled atop the primary coil 110. Electrical power 20 is thus uniquely transferred to each mobile device 12, according to its associated calendric pattern 30, battery condition, and/or calendar events 140.

Figure 20:
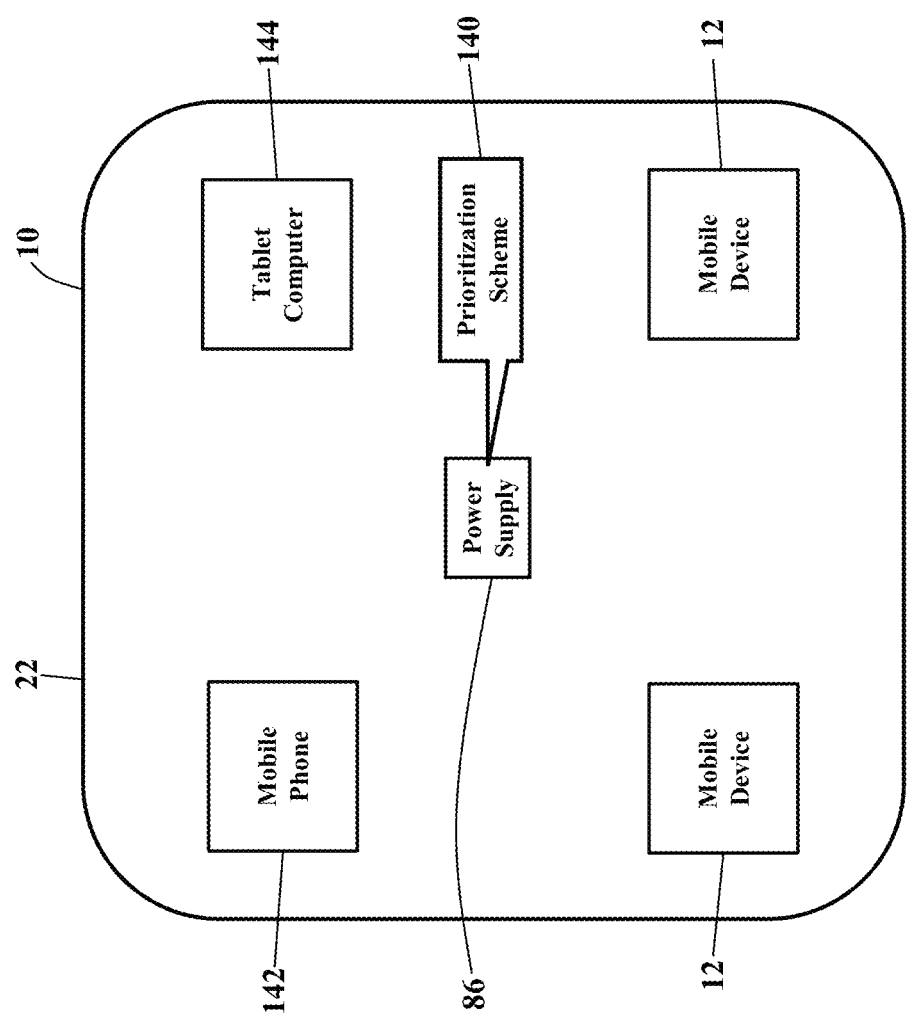
FIG. 20 is a block diagram illustrating a prioritization scheme, according to exemplary embodiments.

FIG. 20 is a block diagram illustrating a prioritization scheme 140, according to exemplary embodiments. Even though multiple devices 12 may be laid atop the pad 22, not all the devices 12 need be inductively charged. That is, for many reasons, one of the batteries 16 may get preference or priority over another battery 16. Suppose, for example, that a mobile phone 142 has a morning call scheduled in twenty (20) minutes. Exemplary embodiments may thus determine that the mobile phone 142 requires significant electrical power 20 (e.g., a high current and/or voltage) to ensure an adequate charge in twenty (20) minutes. Indeed, exemplary embodiments may even determine that charging of the other mobile devices 12 on the pad 22 must be, or can be, deferred. If a tablet computer 144 has calendric usage only during evening hours, charging of the tablet computer 144 can be delayed to conserve costs and to prioritize the mobile phone 142.

The battery charger 10 itself may have constraints. The power supply 86 in the pad 22, for example, may have power limitations, such that significant electrical power 20 cannot be simultaneously provided to multiple mobile devices 12. So exemplary embodiments may halt or defer charging of other mobile devices and, instead, dedicate electrical power to the primary coil 110 associated with a prioritized mobile device 12. As yet another example, the battery charger 10 may trickle charge one or more mobile devices 12, while providing a full charge to other devices. Because each primary coil 110 may transfer a different electrical power, logical constraints may be implemented to ensure safe operation. The battery charger 10, for example, may retrieve a maximum cumulative total current and/or voltage that is drawn from the power supply 86. If a summed total of current or voltage drawn by all the primary coils 110 equals or exceeds a maximum threshold, charging by one or more primary coils 110 may be halted to prevent an overload condition. Each individual primary coil 110, likewise, may have its own maximum threshold, thus ensuring no one primary coil 110 overloads. Different primary coils 110 may have different thresholds, depending on circuitry features and location within the pad 22. Temperature sensors may also monitor temperatures associated with each primary coil 110 to further ensure safe operation.

Exemplary embodiments may thus include the prioritization scheme 140. As the above paragraph explained, one or more mobile devices 12 may have charging priority, based on the current state of the battery 16, calendric patterns 30, and/or upcoming calendar events 140. However, some mobile devices 12 may simply have priority over other devices. A doctor's mobile device, for example, may have priority over a tablet computer. A work phone may have priority over a personal phone. The prioritization scheme 140, then, may be established for the multiple mobile devices 12 placed on the pad 22. As the pad 22 establishes communication with each mobile device 12, the pad 22 uniquely identifies each mobile device 12 (such as by serial number, make/model, or other identification number). Each mobile device 12 may also transmit its prioritization scheme 140, or the pad 22 may query for the prioritization scheme 140 associated with each identified mobile device 12. Regardless, the various charging strategies 34 may include different prioritizations.

Figure 21:
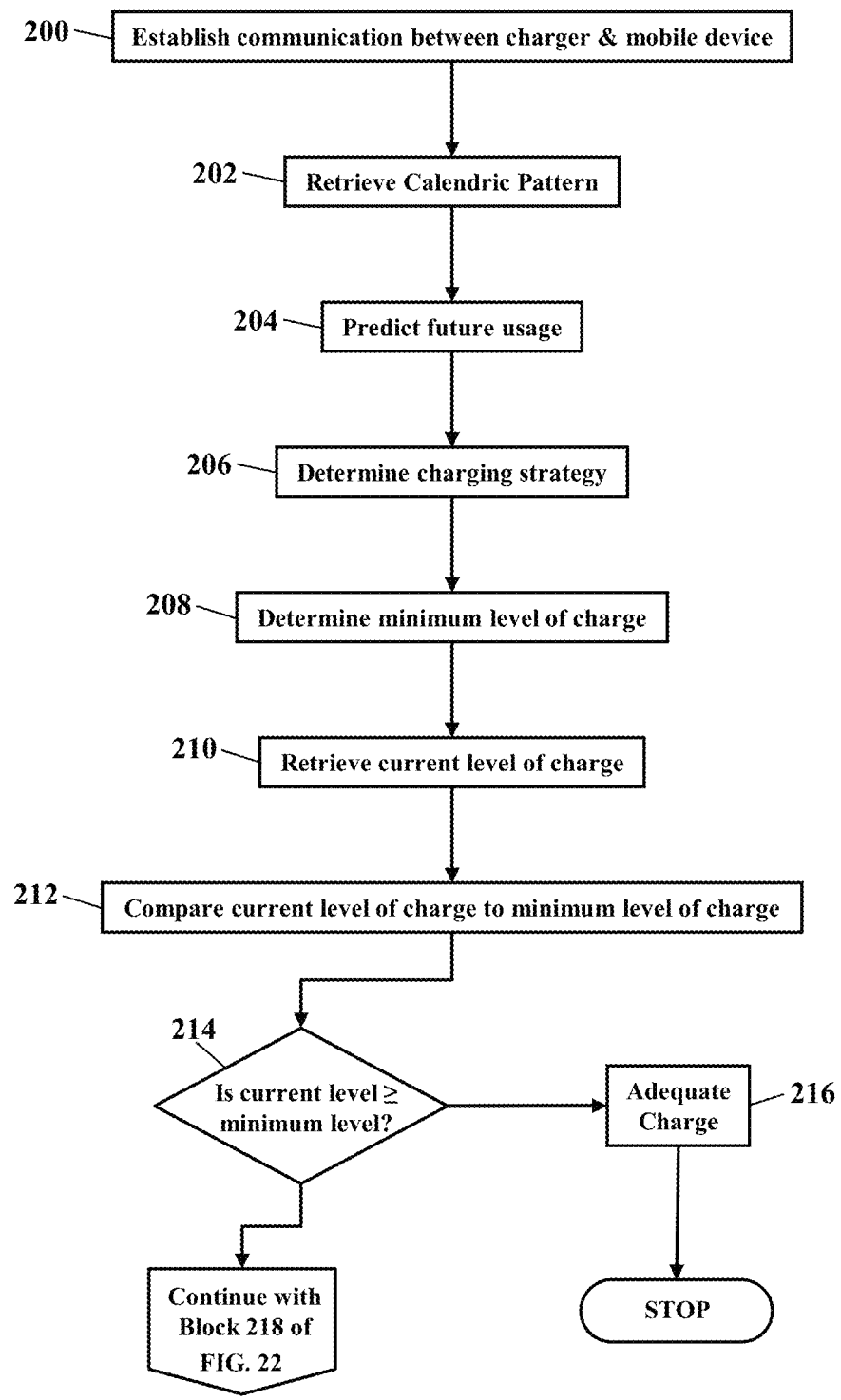
FIGS. 21-22 are flowcharts illustrating a method or algorithm for charging a battery, according to exemplary embodiments.
Figure 22:
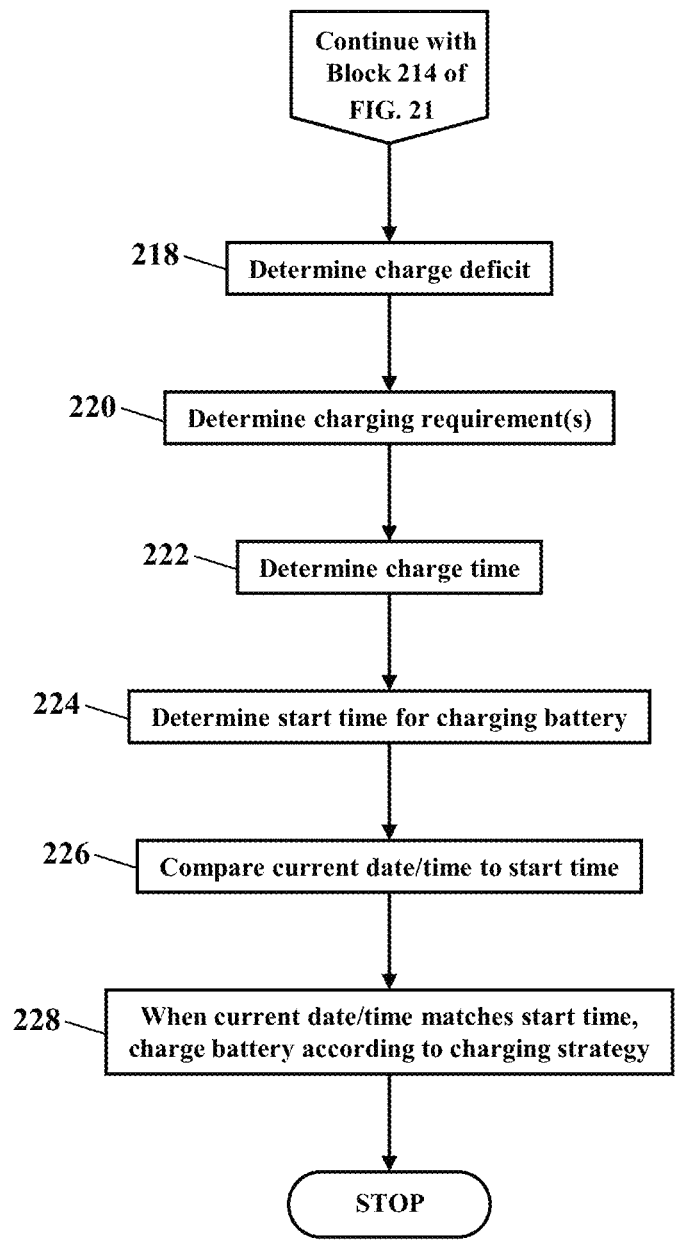

FIGS. 21-22 are flowcharts illustrating a method or algorithm for charging the battery 16, according to exemplary embodiments. Communication is established between the mobile device 12 and the battery charger 10 (Block 200). The calendric pattern 30 is retrieved (Block 202) and future usage may be predicted (Block 204). The charging strategy 34 is determined based on the calendric pattern 30 (Block 206). The minimum level 120 of charge of the battery 16, that is sufficient for the calendric pattern 30, is determined (Block 208). The current level 28 of charge of the battery 16 is retrieved (Block 210) and compared to the minimum level 120 of charge of the battery 16 (Block 212). When the current level 28 of charge equals or exceeds the minimum level 120 of charge (Block 214, then the battery 16 has sufficient charge to satisfy the calendric pattern 30 (Block 216), so perhaps no further action need be taken.

The flowchart continues with FIG. 22. When, however, the current level 28 of charge is less than the minimum level 120 of charge (illustrated as Block 214 in FIG. 21), the charge deficit 122 is determined (Block 218). A difference between the minimum level 120 of charge and the current level 28 of charge may define the charging requirement 124 of the battery 16 (Block 220). The charge time 36 to charge the battery 16 from the current level 28 of charge to the minimum level 120 of charge is determined (Block 222). The start time 130 for charging the battery 16 is determined (Block 224). The start time 130 is compared to the current date and time 132 (Block 226). When the current date and time 132 matches the start time 130, the battery 16 is charged according to the charging strategy 34 (Block 228).

Figure 23:
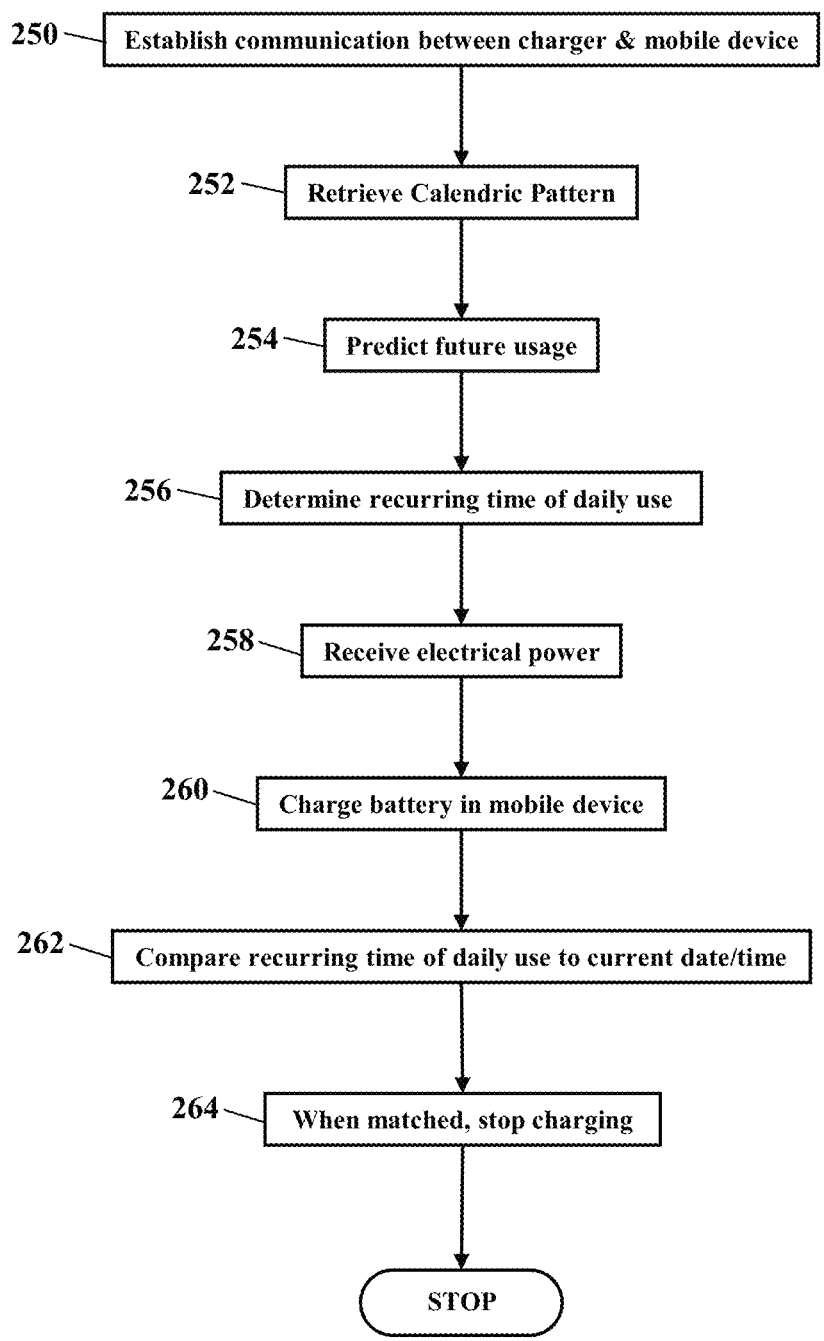
FIG. 23 is another flowchart further illustrating the method or algorithm for charging the battery, according to exemplary embodiments.

FIG. 23 is another flowchart further illustrating the method or algorithm for charging the battery 16, according to exemplary embodiments. Communication is established between the mobile device 12 and the battery charger 10 (Block 250). The calendric pattern 30 is retrieved (Block 252) and future usage may be predicted (Block 254). A recurring time of daily use of the mobile device is determined based on the calendric pattern 30 (Block 256). The electrical power 20 is received from the battery charger 10 (Block 258), and the battery 16 is charged with at least a portion of the electrical power 20 (Block 260). The recurring time of daily use is compared to the current date and time 132 (Block 262). The battery 16 is charged until the current date and time 132 matches the recurring time of daily use. However, when the current date and time 132 matches the recurring time of daily use, charging is stopped (Block 264).

Figure 24:
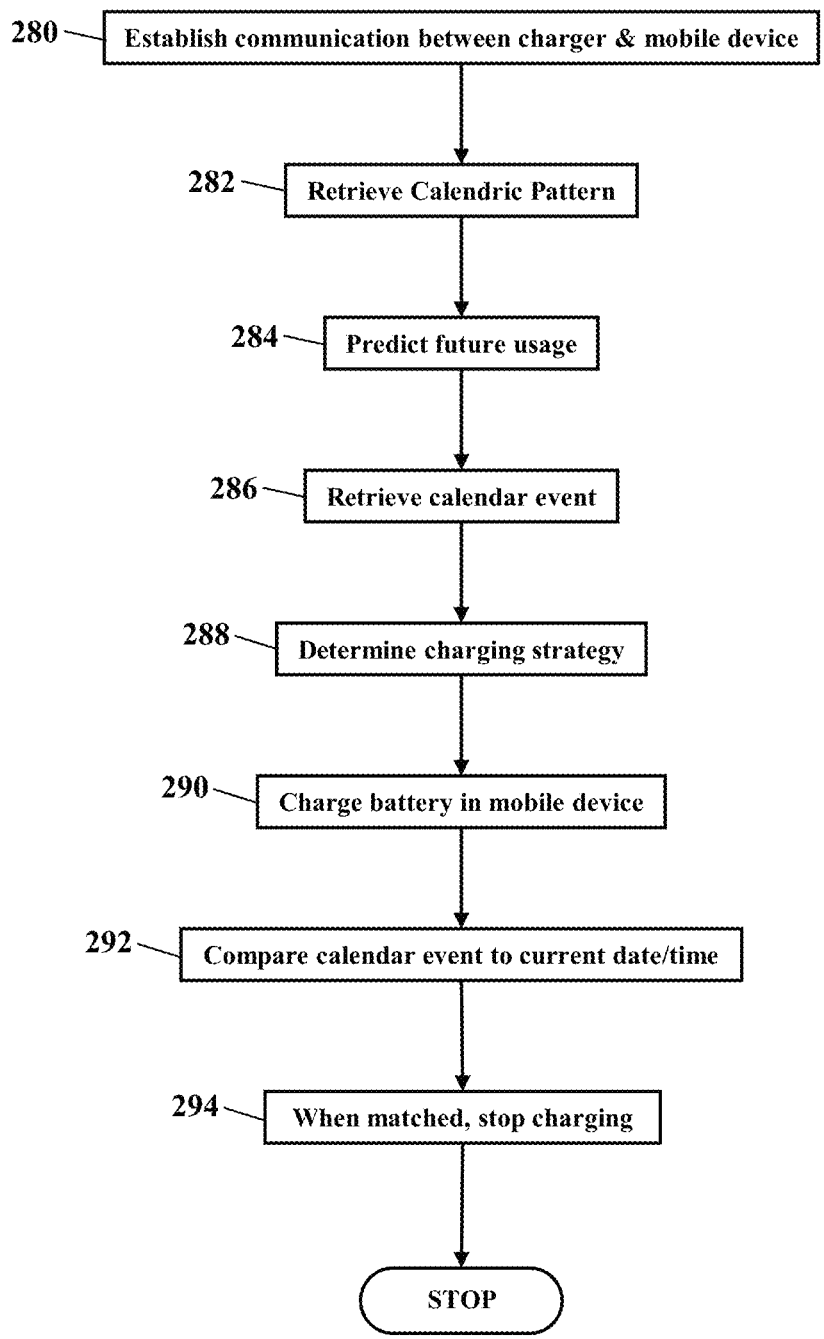
FIG. 24 is another flowchart further illustrating the method or algorithm for charging the battery, according to exemplary embodiments.

FIG. 24 is another flowchart further illustrating the method or algorithm for charging the battery 16, according to exemplary embodiments. Communication is established between the mobile device 12 and the battery charger 10 (Block 280). The calendric pattern 30 is retrieved (Block 282) and future usage may be predicted (Block 284). The calendar event 140 is retrieved from the electronic calendar (Block 286). The charging strategy 34 is determined based on the calendric pattern 30 and the calendar event 140 (Block 288). The battery 16 is charged (Block 290) and the current date and time 132 is compared to the calendar event 140 (Block 292). When the current date and time 132 matches a date and time associated with the calendar event 140, charging is stopped (Block 294).

Figure 25:
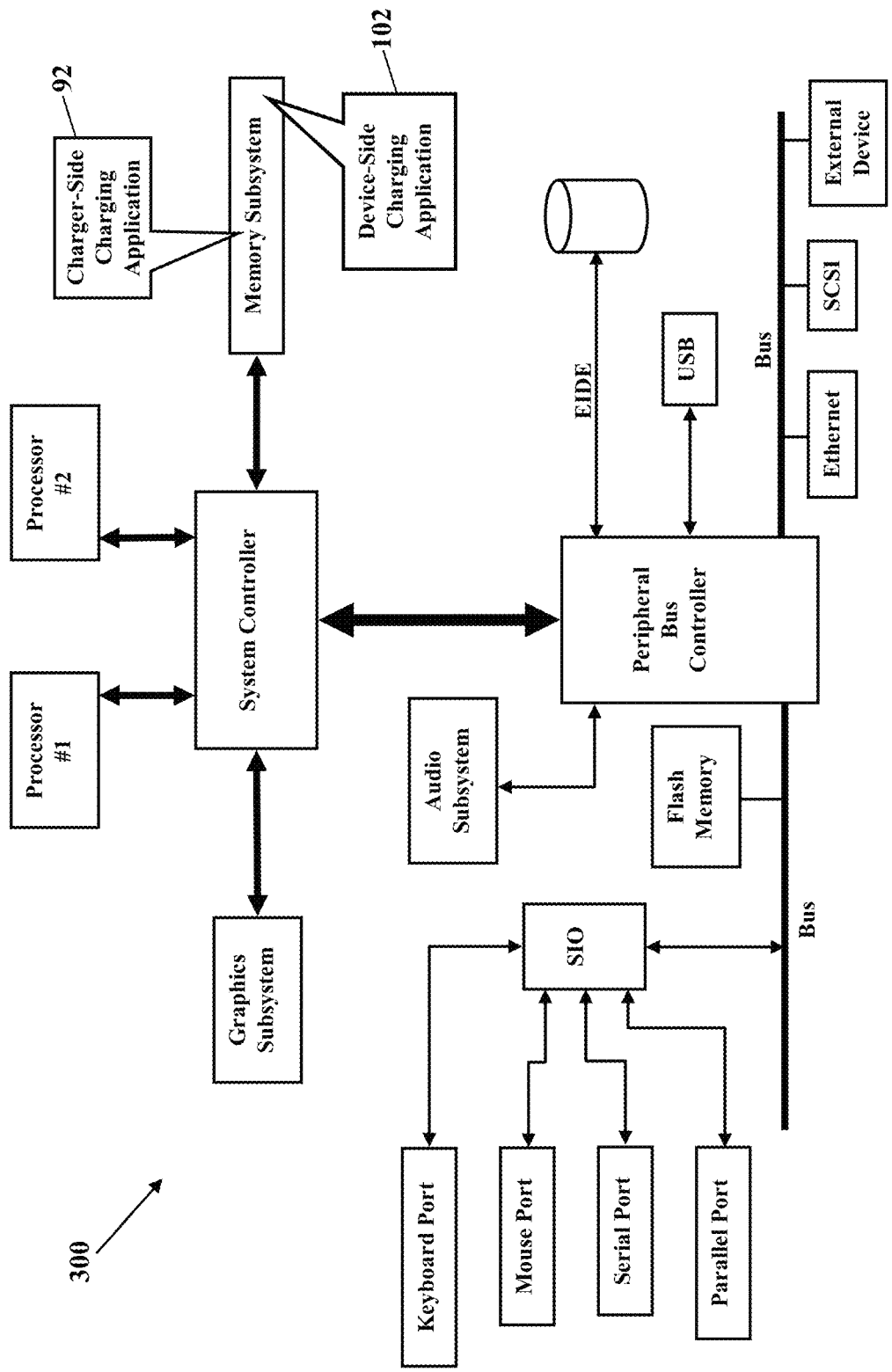

FIG. 25 is a schematic illustrating still more exemplary embodiments. FIG. 25 is a generic block diagram illustrating the device-side charging application 92 and/or the charger-side charging application 102 operating within a processor-controlled device 300. The device-side charging application 92 and/or the charger-side charging application 102 may be stored in a memory subsystem of the processor-controlled device 300. One or more processors communicate with the memory subsystem and execute the device-side charging application 92 and/or the charger-side charging application 102. Because the processor-controlled device 300 illustrated in FIG. 25 is well-known to those of ordinary skill in the art, no detailed explanation is needed.

FIG. 26 depicts still more operating environments for additional aspects of the exemplary embodiments. FIG. 26 illustrates the device-side charging application 92 and/or the charger-side charging application 102 operating within various other processor-controlled devices 300. FIG. 26, for example, illustrates that either application may entirely or partially operate within a set-top box ("STB") (302), a personal/digital video recorder (PVR/DVR) 304, personal digital assistant (PDA) 306, a Global Positioning System (GPS) device 308, an interactive television 310, a smart phone 312, a pager 314, the mobile phone 142, or any computer system, communications device, or processor-controlled device utilizing a processor (such as processors 90 and 10 illustrated in FIG. 12) and/or a digital signal processor (DP/DSP) 318. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Exemplary embodiments may be physically embodied on or in a computer-readable storage medium. This computer-readable medium may include CD-ROM, DVD, tape, cassette, floppy disk, memory card, USB, and large-capacity disks. This computer-readable medium, or media, could be distributed to end-subscribers, licensees, and assignees. A computer program product comprises processor-executable instructions for charging batteries, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a hardware processor, a data sent via a wireless communication with a mobile device, the data representing a historical power consumption of a battery power associated with a battery powering the mobile device;
determining, by the hardware processor, a charging strategy for the battery based on the historical power consumption of the battery power that is calculated to provide a sufficient battery charge for a predicted power consumption of the battery power for a future time period, wherein the sufficient battery charge is less than a full charge of the battery; and
charging, by the hardware processor, the battery to the sufficient battery charge by inductively coupling an electrical power to the mobile device according to the charging strategy.

2. The method of claim 1, further comprising receiving the electrical power.

3. The method of claim 1, further comprising receiving the electrical power from a vehicle.

4. The method of claim 1, further comprising receiving the electrical power from an electrical system powering a vehicle.

5. The method of claim 1, further comprising receiving the electrical power from a charger.

6. The method of claim 1, further comprising providing the electrical power to a coil for the inductively coupling to the mobile device.

7. The method of claim 1, further comprising determining a date and time of the inductively coupling of the electrical power to the mobile device.

8. An apparatus, comprising:
a hardware processor; and
a memory device storing code that, when executed by the hardware processor, cause the hardware processor to perform operations, the operations comprising:
receiving a data sent via a wireless communication with a mobile device, the data representing a historical power consumption of a battery power associated with a battery powering the mobile device;
determining a charging strategy for the battery based on the historical power consumption of the battery power that is calculated to provide a sufficient battery charge for a predicted power consumption of the battery power for a future time period, wherein the sufficient battery charge is less than a full charge of the battery; and
charging the battery to the sufficient battery charge by inductively coupling an electrical power to the mobile device according to the charging strategy.

9. The apparatus of claim 8, wherein the operations further comprise receiving the electrical power.

10. The apparatus of claim 8, wherein the operations further comprise receiving the electrical power from a vehicle.

11. The apparatus of claim 8, wherein the operations further comprise receiving the electrical power from an electrical system powering a vehicle.

12. The apparatus of claim 8, wherein the operations further comprise receiving the electrical power from a charger.

13. The apparatus of claim 8, wherein the operations further comprise providing the electrical power to a coil.

14. The apparatus of claim 8, wherein the operations further comprise determining a date and time of the inductively coupling of the electrical power to the mobile device.

15. A memory device storing code which when executed by a hardware processor, cause the hardware processor to perform operations, the operations comprising:
receiving a data sent via a wireless communication with a mobile device, the data representing a historical power consumption of a battery power associated with a battery powering the mobile device;
determining a charging strategy for the battery based on the historical power consumption of the battery power that is calculated to provide a sufficient battery charge for a predicted power consumption of the battery power for a future time period, wherein the sufficient battery charge is less than a full charge of the battery; and
charging the battery to the sufficient battery charge by inductively coupling an electrical power to the mobile device according to the charging strategy.

16. The memory device of claim 15, wherein the operations further comprise receiving the electrical power.

17. The memory device of claim 15, wherein the operations further comprise receiving the electrical power from a vehicle.

18. The memory device of claim 15, wherein the operations further comprise receiving the electrical power from an electrical system powering a vehicle.

19. The memory device of claim 15, wherein the operations further comprise receiving the electrical power from a charger.

20. The memory device of claim 15, wherein the operations further comprise providing the electrical power to a coil.

\* \* \* \* \*